United States Patent
Saini et al.

(10) Patent No.: US 11,109,083 B2
(45) Date of Patent: Aug. 31, 2021

(54) UTILIZING A DEEP GENERATIVE MODEL WITH TASK EMBEDDING FOR PERSONALIZED TARGETING OF DIGITAL CONTENT THROUGH MULTIPLE CHANNELS ACROSS CLIENT DEVICES

(71) Applicant: Adobe Inc., San Jose, CA (US)

(72) Inventors: Shiv Kumar Saini, Jhunjhunu (IN); Sunny Dhamnani, Bangalore (IN); Prithviraj Abasaheb Chavan, Mumbai (IN); A S Akil Arif Ibrahim, Chennai (IN); Aakash Srinivasan, Chennai (IN)

(73) Assignee: ADOBE INC., San Jose, CA (US)

( * ) Notice: Subject to any disclaimer, the term of this patent is extended or adjusted under 35 U.S.C. 154(b) by 195 days.

(21) Appl. No.: 16/257,571

(22) Filed: Jan. 25, 2019

(65) Prior Publication Data
US 2020/0245009 A1 Jul. 30, 2020

(51) Int. Cl.
  *H04N 21/25* (2011.01)
  *G06N 20/20* (2019.01)
  *G06N 7/00* (2006.01)
  *H04N 21/6379* (2011.01)
  *H04N 21/81* (2011.01)

(52) U.S. Cl.
  CPC .......... *H04N 21/251* (2013.01); *G06N 7/005* (2013.01); *G06N 20/20* (2019.01); *H04N 21/6379* (2013.01); *H04N 21/8193* (2013.01)

(58) Field of Classification Search
  CPC ................................................. H04N 21/251
  See application file for complete search history.

(56) References Cited

U.S. PATENT DOCUMENTS

| | | | | |
|---|---|---|---|---|
| 2017/0300814 | A1* | 10/2017 | Shaked | G06N 3/0472 |
| 2019/0205965 | A1* | 7/2019 | Li | G06Q 30/0631 |
| 2019/0258722 | A1* | 8/2019 | Guo | G06N 3/0454 |

OTHER PUBLICATIONS

Martín Abadi, Paul Barham, Jianmin Chen, Zhifeng Chen, Andy Davis, Jeffrey Dean, Matthieu Devin, Sanjay Ghemawat, Geoffrey Irving, Michael Isard, et al. 2016. Tensorflow: a system for large-scale machine learning. In OSDI, vol. 16. 265-283.

(Continued)

*Primary Examiner* — Michael H Hong
(74) *Attorney, Agent, or Firm* — Keller Jolley Preece

(57) ABSTRACT

The present disclosure relates to systems, methods, and non-transitory computer readable media for training and utilizing a generative machine learning model to select one or more treatments for a client device from a set of treatments based on digital characteristics corresponding to the client device. In particular, the disclosed systems can train and apply a variational autoencoder with a task embedding layer that generates estimated effects for treatment combinations. For example, the disclosed systems receive, as input, digital characteristics corresponding to the client device and various treatment combinations. The disclosed systems apply the trained generative machine learning model with the task embedding layer to the digital characteristics to generate effect estimations for the various treatment combinations. Based on the effect estimations for the treatment combinations, the disclosed systems select one or more treatments to provide to the client device.

20 Claims, 13 Drawing Sheets

(56) References Cited

OTHER PUBLICATIONS

Elias Bareinboim and Judea Pearl. 2012. Controlling Selection Bias in Causal Inference. In Proceedings of the Fifteenth International Conference on Artificial Intelligence and Statistics (Proceedings of Machine Learning Research), Neil D. Lawrence and Mark Girolami (Eds.), vol. 22. PMLR, La Palma, Canary Islands, 100-108. http://proceedings.mlr.press/v22/bareinboim12.html.

Leo Breiman. 2001. Random forests. Machine learning 45, 1 (2001), 5-32.

Hugh A. Chipman, Edward I George, Robert E McCulloch, et al. 2010. BART: Bayesian additive regression trees. The Annals of Applied Statistics 4, 1 (2010), 266-298.

William B Dodds, Kent B Monroe, and Dhruv Grewal. 1991. Effects of price, brand, and store information on buyers' product evaluations. Journal of marketing research (1991), 307-319. https://www.jstor.org/stable/3172866?seq=1#page_scan_tab_contents.

Vincent Dorie, Jennifer Hill, Uri Shalit, Marc Scott, and Dan Cervone. 2017. Automated versus do-it-yourself methods for causal inference: Lessons learned from a data analysis competition. arXiv preprint arXiv:1707.02641 (2017).

Peter S Fader, Bruce GS Hardie, and Ka Lok Lee. 2005. RFM and CLV: Using iso-value curves for customer base analysis. Journal of marketing research 42, 4 (2005), 415-430.

Jerome H Friedman. 2001. Greedy function approximation: a gradient boosting machine. Annals of statistics (2001), 1189-1232.

Wayne A Fuller. 2009. Measurement error models. vol. 305. John Wiley & Sons.

Ian Goodfellow, Jean Pouget-Abadie, Mehdi Mirza, Bing Xu, DavidWarde-Farley, Sherjil Ozair, Aaron Courville, and Yoshua Bengio. 2014. Generative adversarial nets. In *Advances in neural information processing systems*. 2672-2680.

Sander Greenland and Timothy Lash. 2008.Biasanalysis.In Modern epidemiology (3 ed.), Kenneth J Rothman, Sander Greenland, Timothy L Lash, et al. (Eds.). Lippincott Williams & Wilkins, 345-380.

Sander Greenland, James M Robins, and Judea Pearl. 1999. Confounding and collapsibility in causal inference. Statistical science (1999), 29-46.

Zvi Griliches and Jerry A Hausman. 1986. Errors in variables in panel data. Journal of econometrics 31, 1 (1986), 93-118.

Nabanita Datta Gupta and Marianne Simonsen. 2010. Non-cognitive child outcomes and universal high quality child care. Journal of Public Economics 94, 1-2 (2010), 30-43. https://www.sciencedirect.com/science/article/abs/pii/S0047272709001169.

Matthew John Hausknecht.1995.Cooperation and Communication in Multiagent Deep Reinforcement Learning. (1995), 114-117 pages.

Miguel A. HernÁąn, Sonia HernÁąndez-DÁą ŋ az, and James M. Robins. 2004. A Structural Approach to Selection Bias. Epidemiology 15, 5 (2004), 615-625. http://www.jstor.org/stable/20485961.

Jennifer L Hill. 2011. Bayesian nonparametric modeling for causal inference. Journal of Computational and Graphical Statistics 20, 1 (2011), 217-240.

Guido W Imbens and Donald B Rubin. 2015. Causal inference in statistics, social, and biomedical sciences. Cambridge University Press.

Fredrik Johansson, Uri Shalit, and David Sontag. 2016. Learning representations for counterfactual inference. In International Conference on Machine Learning. 3020-3029.

Diederik P Kingma and Max Welling. 2013. Auto-encoding variational bayes. arXiv preprint arXiv:1312.6114 (2013).

Diederik P Kingma and Max Welling. 2014. Stochastic gradient VB and the variational auto-encoder. In Second International Conference on Learning Representations, ICLR.

Manabu KurokiY and Judea Pearl. 2011. Measurement Bias and Effect Restoration in Causal Inference. (2011).

T.L Lai and Herbert Robbins. 1985. Asymptotically Efficient Adaptive Allocation Rules. Adv. Appl. Math. 6, 1 (Mar. 1985), 4-22. https://doi.org/10.1016/ 0196- 8858(85)90002- 8.

Michael J Lopez, Roee Gutman, et al. 2017. Estimation of causal effects with multiple treatments: a review and new ideas. Statist. Sci. 32, 3 (2017), 432-454.

Christos Louizos, Uri Shalit, Joris M Mooij, David Sontag, Richard Zemel, and Max Welling. 2017. Causal effect inference with deep latent-variable models. In Advances in Neural Information Processing Systems. 6446-6456.

Judea Pearl. 2009. Causality. Cambridge university press.

Judea Pearl. 2012. On measurement bias in causal inference. arXiv preprint arXiv:1203.3504 (2012).

Fabian Pedregosa, Gaël Varoquaux, Alexandre Gramfort, Vincent Michel, Bertrand Thirion, Olivier Grisel, Mathieu Blondel, Peter Prettenhofer, Ron Weiss, Vincent Dubourg, et al. 2011. Scikit-learn: Machine learning in Python. Journal of machine learning research 12, Oct. 2011, 2825-2830.

Donald B Rubin. 1974. Estimating causal effects of treatments in randomized and nonrandomized studies. Journal of educational Psychology 66, 5 (1974), 688.

D. E. Rumelhart, G. E. Hinton, and R. J. Williams. 1986. Parallel Distributed Processing: Explorations in the Microstructure of Cognition, vol. 1. MIT Press, Cambridge, MA, USA, Chapter Learning Internal Representations by Error Propagation, 318-362.http://dl.acm.org/citation.cfm?id=104279.104293.

Uri Shalit, Fredrik D. Johansson, and David A Sontag. 2017. Estimating individual treatment effect: generalization bounds and algorithms. In ICML.

Dustin Tran, Alp Kucukelbir, Adji B Dieng, Maja Rudolph, Dawen Liang, and David M Blei. 2016. Edward: A library for probabilistic modeling, inference, and criticism. arXiv preprint arXiv:1610.09787 (2016).

Jinsung Yoon, James Jordon, and Mihaela van der Schaar. 2018. GANITE: Estimation of Individualized Treatment Effects using Generative Adversarial Nets. In International Conference on Learning Representations.

\* cited by examiner

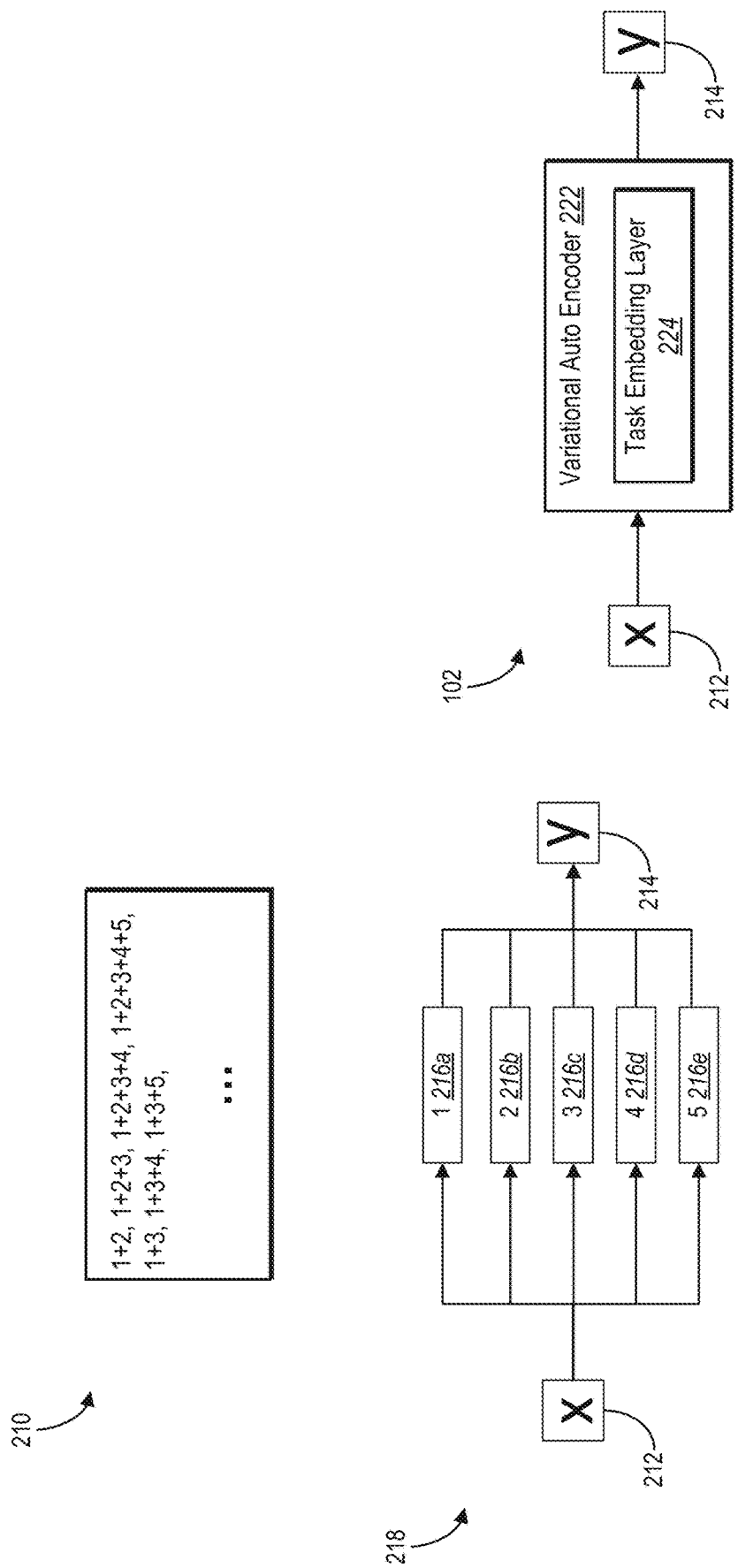

UTILIZING A DEEP GENERATIVE MODEL WITH TASK EMBEDDING FOR PERSONALIZED TARGETING OF DIGITAL CONTENT THROUGH MULTIPLE CHANNELS ACROSS CLIENT DEVICES

BACKGROUND

Advancements in software and hardware platforms have led to a variety of innovations in individualized digital content distribution to client devices across computer networks. For example, conventional digital content distribution systems are able to select and transmit customized digital content to client devices based on unique features corresponding to the client device. To illustrate, some conventional systems first predict impact of digital content at a client device, and then provide the digital content based on the predicted impact. Specifically, some conventional digital content distribution systems conduct randomized control trials to estimate effects of providing digital content to a client device via a particular distribution channel. Additionally, some conventional systems are able to use various randomized control trials to determine effects of providing digital content through which distribution channel or combination of distribution channels.

Despite these advances, conventional digital content distribution systems continue to suffer from a number of disadvantages, particularly in accuracy, efficiency, and flexibility. For instance, while some conventional digital content distribution systems estimate the causal effect of distributing digital content across particular distribution channels, the effects are often misleading and inaccurate. In particular, conventional systems that combine the action effects of individual distribution channels to drive the effect of a combination of actions fail to accurately capture interdependence between individual treatments. For example, combining the action effects of individual distribution channels often fail to reflect negative or positive interactions between individual treatments. Conventional systems that treat each combination of treatments as an individual treatment do not account for the impact of individual treatments across treatment combinations. Additionally, conventional systems that treat treatment combinations as individual treatments also lead to inaccuracy by utilizing incomplete datasets (e.g., datasets where some treatment combinations are not observed).

Furthermore, some conventional digital content distribution systems utilize observational data to estimate the effects of applied actions. Such systems also lead to inaccurate results because actions in observational data are often not assigned randomly. For example, most conventional digital content distributions systems that utilize observational data are subject to selection biases. Namely, digital content is often presented to a client device and corresponding user with the propensity to utilize the digital content. Thus, the effects of digital content distribution are often overestimated. Further, additional biases result when individuals self-select to be part of an action group. Conventional digital content distribution systems often fail to account for latent confounders that influence decisions at client devices. For example, conventional digital content distribution systems often lack the technical capability to identify individual wants or needs that motivate decisions at particular client devices.

In addition, conventional digital content distribution systems are also inefficient. In particular, conventional digital content distribution systems require significant time and computing resources to analyze effects of a combination of actions. For example, conventional randomized control trials cannot be used directly for personalized targeting. Instead, conventional systems often require additional use of modelling to find the right set of actions for each individual. Additionally, conventional systems that treat each combination of distribution channels as separate treatments cannot utilize information specific to individual distribution channels across treatments. In addition, the computing resources required to estimate the effect of each combination of actions for a customer grows exponentially as the number of potential actions in each combination of actions increases. Even conventional digital content distribution systems that utilize neural networks are inefficient when predicting effects of a combination of actions. In particular, conventional digital content distribution systems often use separate private neural network channels for each action. Thus, extending conventional digital content distribution systems to multiple actions explode the network size and the number of parameters to learn. Indeed, some conventional systems can take eight hours or more to properly train.

Moreover, some conventional digital content distribution systems are inflexible. For example, conventional digital systems are limited to generating predictions for a limited number of actions within a combination of actions. As an illustration, five individual actions yield thirty-two different combinations of actions. Conventional digital content distribution systems are often unable to increase the number of individual actions within a combination because the number of combinations increases exponentially. In particular, conventional digital content distribution systems often require generating separate models for each action in addition to each action combination. Thus, conventional systems are often unscalable. For example, conventional digital content distribution systems often fail to observe all combination of actions as multiple actions are added to each subset. Because many subsets of actions are not observed, conventional digital content distribution systems face difficulty in applying a number of existing models for any particular combination of actions.

Thus, there are several disadvantages with regard to conventional digital content distribution systems.

SUMMARY

One or more embodiments described herein provide benefits and solve one or more of the foregoing or other problems in the art with systems, methods, and non-transitory computer readable media that utilize a deep generative model with a task embedding layer for distribution of digital content to client devices through multiple channels. For example, in one or more embodiments, the disclosed systems utilize a novel architecture of a machine learning model to estimate the causal effect of any subset of treatments on one or more client devices. Specifically, the disclosed systems can utilize a task embedding layer within a variational autoencoder as part of a scalable approach for conducting counterfactual experiments on the effects for multiple applied treatments. In particular, the disclosed systems can use a task embedding layer to model the higher order effects of multiple treatments, allowing the model to flexibly and efficiently scale to multiple treatments and accurately determine the most effective treatment for various client devices. Additional features and advantages of the present application will be set forth in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIGS. 2B-2C illustrate conventional systems and the multi-treatment embedding selection system in accordance with one or more embodiments;

DETAILED DESCRIPTION

Figure 1:
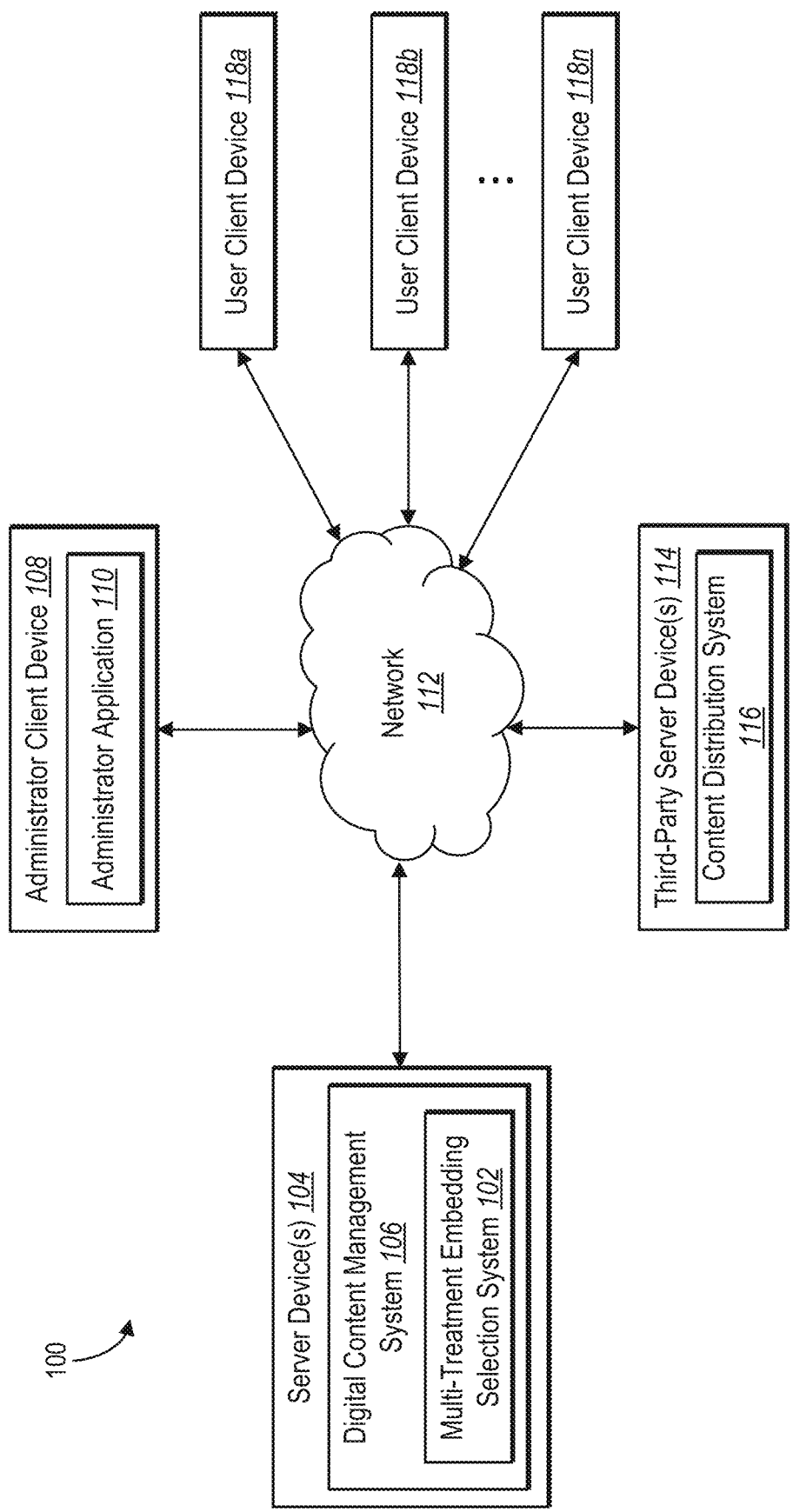
FIG. 1 illustrates an example environment for implementing a multi-treatment embedding selection system in accordance with one or more embodiments.

One or more embodiments of the present disclosure include a multi-treatment embedding selection system that uses a generative machine learning model with a task embedding layer to estimate the causal effect of any subset of treatments in selecting and providing digital content to client devices. Indeed, in one or more embodiments the multi-treatment embedding selection system uses a variational autoencoder with a unique task embedding layer to flexibly, efficiently, and accurately model interdependence between combinations of treatments. By utilizing a generative machine learning model with a task embedding layer, the multi-treatment embedding selection system can model latent or unobserved confounders in accurately determining treatment effects. For example, the multi-treatment embedding selection system can analyze a set of observed digital characteristics of a client device and a set of possible treatments. The multi-treatment embedding selection system can utilize the task embedding layer to embed inter-dependence of multiple treatment combinations from the set of possible treatments into the generative machine learning model. The multi-treatment embedding selection system can then utilize the generative machine learning model to predict multi-treatment effect estimations and (ultimately) select treatments for client devices.

To illustrate, in one or more embodiments, the multi-treatment embedding selection system trains a generative machine learning model having a task embedding layer. Specifically, the multi-treatment embedding selection system can manage and/or access a digital repository of historical training data that includes training characteristic sets corresponding to training client devices, training treatments, and training effects. The multi-treatment embedding selection system can apply a generative machine learning model (e.g., a variational autoencoder) to a training characteristic set and generate a predicted distribution of treatments in light of the training characteristic set. The multi-treatment embedding selection system can then utilize a task embedding layer of the variational autoencoder to generate a task embedding of the treatments based on the predicted distribution of the treatments. Utilizing the variational autoencoder to analyze the task embedding and the training characteristic set, the multi-treatment embedding selection system can generate predicted distributions (e.g., a predicted multi-treatment effect). The multi-treatment embedding selection system can then modify parameters of the generative machine learning model (e.g., train the variational autoencoder) by comparing the predicted distributions (e.g., the predicted multi-treatment effect) with training data (e.g., a training effect from the digital repository of historical training data).

Upon training, the multi-treatment embedding selection system can apply the generative machine learning model. For example, in one or more embodiments the multi-treatment embedding selection system identifies a client device, digital characteristics corresponding to the client device, and a set of possible treatments. The multi-treatment embedding selection system can apply the task embedding layer of the trained generative machine learning model to a subset of treatments to generate a task embedding of the subset of treatments. The multi-treatment embedding selection system can then analyze the task embedding and the digital characteristics utilizing the generative machine learning model (e.g., the variational autoencoder) to generate a multi-treatment effect estimation. Based on the generated multi-treatment effect estimation, the multi-treatment embedding selection system can select treatments to provide to the client device.

As just mentioned above, the generative machine learning model can include a variational autoencoder with a task embedding layer. Generally, the multi-treatment embedding selection system can use the task embedding layer to scale the variational autoencoder for multiple treatments. In particular, in one or more embodiments the task embedding layer can transform treatment subsets into task embeddings that comprise continuous vectors representing interdependence between the individual treatments in the treatment subsets. The multi-treatment embedding selection system can generate task embeddings corresponding to each treatment subset to estimate the effects of each treatment subset on a client device. Additionally, the multi-treatment embedding selection system utilizes the generated task embeddings to account for latent (i.e., unobserved) confounders in determining predicted outcomes.

In one or more embodiments, the multi-treatment embedding selection system can utilize a variational autoencoder that includes an encoder and a decoder. The encoder can estimate the distribution of latent confounders (e.g., needs and wants or other unknown variables impacting effect) using digital characteristics (including observed user behaviors). More particularly, in one or more embodiments, the encoder uses an embedding matrix within the task embedding layer to transform a treatment subset to task embedding and then determines the latent confounders based on the task embedding. In one or more embodiments, the multi-treatment embedding selection system then feeds the latent confounders to a decoder. The decoder can analyze the latent confounders to generate multi-treatment effects.

As mentioned above, after the multi-treatment embedding selection system has trained the network parameters in the variational autoencoder, the multi-treatment embedding selection system can receive, as input, digital characteristics and possible treatments. In one or more embodiments, the multi-treatment embedding selection system generates outcomes of different treatment combination based on the observed digital characteristics. Based on comparing outcomes for various treatment combinations, the multi-treatment embedding selection system can generate a treatment combination recommendation and/or select a treatment for providing digital content to a client device.

The multi-treatment embedding selection system provides many advantages and benefits over conventional systems and methods. For example, by utilizing a trained generative machine learning model with a task embedding layer, the multi-treatment embedding selection system accurately accounts for interdependence between individual treatments in treatment combinations. Whereas conventional systems generally rely on treating combinations of treatments as either sums of component treatments or as individual treatments, the multi-treatment embedding selection system can incorporate the effect of multiple treatments and model the interdependence between the treatments. Additionally, the multi-treatment embedding selection system can explicitly model unobserved latent confounders using the variational autoencoder. Thus, by modeling unobserved latent confounders in addition to receiving observed digital characteristics, the multi-treatment embedding selection system improves accuracy of predicted treatment combination outcomes over conventional systems. Indeed, as illustrated by experimental results discussed below, the multi-treatment embedding selection system can provide more than a 30% improvement relative to conventional systems.

The multi-treatment embedding selection system also improves efficiency relative to conventional systems. For example, the multi-treatment embedding selection system can utilize a generative machine learning model with the task embedding layer to determine a joint probability distribution for a plurality of treatments. The joint probability distribution enables the multi-treatment embedding selection system to recover individual treatment effects. Thus, rather than using separate paths for various treatments that exponentially increase computational requirements, the multi-treatment embedding selection system can utilize a single task-embedding layer (e.g., a single task-embedding layer in an encoder and/or decoder) to generate a joint probability distribution for available treatments. By using a single task-embedding layer, the multi-treatment embedding selection system makes improvements on efficiency relative to conventional systems by requiring less time and fewer computing resources.

Additionally, the multi-treatment embedding selection system improves flexibility over conventional systems and methods. For example, the multi-treatment embedding selection system is scalable to multiple treatments. By adjusting the dimensions of the embedding matrix of the task embedding layer, the multi-treatment embedding selection system can scale well for large numbers of treatments. Additionally, because the multi-treatment embedding selection system finds and samples joint probability distributions, the multi-treatment embedding selection system can predict outcomes for a number of treatments without necessarily requiring observational data for every individual or combination of treatments. Thus, the multi-treatment embedding selection system improves flexibility relative to conventional systems.

Furthermore, the multi-treatment embedding selection system 102 improves accuracy and flexibility relative to conventional systems by quantifying an error value for an estimated multi-treatment effect. In particular, by estimating a joint distribution, the multi-treatment embedding selection system can determine variants and co-variants. Based on the variants and co-variants, the multi-treatment embedding selection system 102 can generate a confidence score in the predicted multi-treatment effect. This allows the multi-treatment embedding system to evaluate not only a prediction, but a probability distribution corresponding to a multi-treatment estimation (e.g., evaluate probability distributions across different models to determine the efficacy of each model).

As illustrated by the foregoing discussion, the present disclosure utilizes a variety of terms to describe features and benefits of the multi-treatment embedding selection system. Additional detail is hereafter provided regarding the meaning of these terms as used in this disclosure. For example, as used herein, the term trained "generative machine learning model" refers to one or machine learning models that generate a prediction based on an estimated distribution. In particular, "generative machine learning model" includes a neural network that estimates a joint distribution of variables to determine a multi-treatment effect estimation (e.g., a conditional probability of effect for treatments given digital characteristics corresponding to a client device). For example, a generative machine learning model can refer to a variational autoencoder neural network which consists of an encoder and a decoder that generate a multi-treatment effect estimation.

As used herein, the term "neural network" refers to an artificial machine learning model that learns tasks by analyzing example data utilizing a plurality of layers that analyze features of the example data at different levels of abstraction. In particular, the term "neural network" can include a model of interconnected digital neurons that communicate and learn to approximate complex functions and generate outputs based on a plurality of inputs provided to the model. For example, the term neural network can include a variational autoencoder. To illustrate, in one or more embodiments, the multi-treatment embedding selection system utilizes a variational autoencoder neural network to generate multi-treatment effect estimations, as described in greater detail below.

As mentioned, in some embodiments, the multi-treatment embedding selection system trains one or more generative machine learning models based on training data. As used herein, the term "train" refers to utilizing information to tune or teach a machine learning model, such as a neural network. The term "training" (used as an adjective or descriptor, such as "training client devices," "training treatments," and "training effects") refers to information or data used to tune or teach the machine learning model (e.g., neural network). For example, training treatments can include actions taken with respect to different client devices and training effects can include observed outcomes corresponding to the actions.

As used herein, the term "digital characteristics" refers to digital data or information corresponding to a client device. In particular, digital characteristics can include usage data that corresponds with a user of a client device. For example, digital characteristics can include information such as client device data including application information (e.g., whether an application is or installed and/or utilized on a device), client device usage data, or a client device user profile (e.g., client location or demographic information). For instance, digital characteristics can refer to previous interactions via a client device (e.g., clicks or views in relation to digital content such as a website, email, or text), historical purchase information (e.g., purchases via a website), or product usage data (e.g., hours using a software application). Digital characteristics can also refer to online activity of a client device. For example, online activity can include URLs of webpages visited by a client device and information regarding the client device when accessing the webpages such as location of the client device, source of a visit, a time-stamp, and client device actions (e.g., products purchased, products viewed, information viewed, etc.) taken on respective webpages.

As used herein, the term "digital content" refers to any content that exists in the form of digital data. In particular, digital content can include digital images, digital video, digital audio, or text, or other types of digital media. Additionally, digital content can include digital advertising content such as paid search advertisements, social media advertisements, emails, or push notifications. In particular, digital content can be adjusted and individualized based on the digital content recipient associated with a user client device.

As used herein, the term "distribution channel" refers to a medium, channel, outlet, or method by which a user can access or receive information. For example, a distribution channel can include a medium by which a client device receives digital content. Distribution channels include, but are not necessarily limited to, email, referring domains, display, social media, organic search, or paid search.

As used herein, the term "treatment" refers to an action, such as providing digital content to a client device via a distribution channel. For example, a treatment can include sending, to a client device, an email, a text message, a push notification, or displaying a web advertisement on social media or other website. The singular term "treatment" can include using a distribution channel to provide digital content to a client device. The plural term "treatments" refers to using two or more combinations of distribution channels and/or digital content. For example, a first treatment can include sending a first email with digital content and a second treatment can include sending a second email with different digital content. Although many of the embodiments described herein focus on providing digital content to client devices (e.g., personalized marketing action targeting), the multi-treatment embedding selection system can analyze and select a variety of treatments in a variety of applications. For example, the multi-treatment embedding selection system can apply in a wide array of domains, such as economics (e.g., selection of economic policy combinations), medicine (e.g., medical treatment combination selection), or public policy (e.g., child care treatment).

As used herein, the term "multi-treatment effect estimation" refers to a prediction, approximation, determination, or estimation of the impact, results, or effect of multiple treatments. In particular, multi-treatment effect estimation can include the estimated causal effect of providing a treatment subset when the treatment subset is applied to a user client device. In some embodiments, multi-treatment effect estimations are specific to client devices; therefore, multi-treatment effect estimations can be different for different client devices. An example of a multi-treatment effect estimation includes an estimated conversion rate for a user associated with a client device when a treatment subset is applied to the user.

As used herein, the term "task embedding layer" (e.g., a "multi-task embedding layer") refers to a portion of a generative machine learning model that generates an embedding reflecting one or more treatments (e.g., a multi-task embedding). In particular, a task embedding layer can embed multiple treatments as a task embedding. As described in greater detail below, the task embedding layer can embed the interdependence of multiple treatments by sampling from a treatment distribution in light of digital characteristics.

As used herein, the term "task embedding" refers to a representation of one or more treatments. In particular, a task embedding (e.g., multi-task embedding) includes a representation of a plurality of treatments generated by a task embedding layer. For example, as described below, a task embedding can include a representation of a weighted sampling drawn from a probability distribution of treatments resulting from digital characteristics. As described in greater detail below, the task embedding can reflect the interdependence of multiple treatments by drawing from treatment distributions in light of digital characteristics.

Additional detail regarding the multi-treatment embedding selection system will now be provided with reference to the figures. For example, FIG. 1 illustrates a schematic diagram of an example environment 100 for implementing a multi-treatment embedding selection system 102 in accordance with one or more embodiments. An overview of the multi-treatment embedding selection system 102 is described in relation to FIG. 1. Thereafter, a more detailed description of the components and processes of the multi-treatment embedding selection system 102 is provided in relation to the subsequent figures.

As shown in FIG. 1, the environment 100 includes server device(s) 104, an administrator client device 108, a network 112, third-party server device(s) 114, and user client devices 118*a*-118*n* (collectively "user client devices 118"). Each of the components of the environment can communicate via the network 112, any suitable network over which computing devices can communicate. Example networks are discussed in more detail below in relation to FIG. 11.

As illustrated in FIG. 1, the environment 100 includes the user client devices 118. The user client devices 118 may comprise various types of client devices. For example, in some embodiments, the user client devices 118 include mobile devices such as laptops, tablets, mobile telephones, smartphones, etc. In other embodiments, the user client devices 118 include non-mobile devices, such as desktops or servers, or other types of client devices. Additional details with regard to the user client devices 118 are discussed below with respect to FIG. 11.

As shown in FIG. 1, the environment 100 includes the server device(s) 104. The server device(s) 104 may generate, store receive, and transmit electronic data, such as digital video, digital images, metadata, etc. The server device(s) 104 may receive data from the administrator client device 108, the user client devices 118, and the third-party server device(s) 114. For example, the server device(s) 104 may gather and/or receive online activity data, web-analytics data, display ad interactions data, email interaction data, and product usage data. Additionally, the server device(s) 104 can communicate with the administrator client device 108, the user client devices 118, and the third-party server device(s) 114. In particular, the server device(s) 104 can apply a treatment by sending digital content via a distribution channel to a user client device of the user client devices 118. The server device(s) 104 can communicate with the administrator client device 108, the user client devices 118, and the third-party server device(s) 114 via the network 112. In some embodiments, the server device(s) 104 comprises a content server. The server device(s) 104 can also comprise an application server, a communication server, a web-hosting server, a social networking server, or a digital content campaign server.

As shown in FIG. 1, the server device(s) 104 also include the digital content management system 106. The digital content management system 106 facilitates creating, modifying, editing, sharing, distributing, and/or managing digital content, including web sites or other interactive digital content. For example, the digital content management system 106 can store a repository of digital content, including digital images, digital videos, data graphics, text data, messaging data, and other digital content received from the administrator client device 108, the third-party server device(s) 114, and/or the server device(s) 104. Moreover, the digital content management system 106 can monitor, collect, and analyze activity of the user client devices 118 (e.g., analyze online activity of the user client devices 118). In addition, the digital content management system 106 can distribute digital content (e.g., digital media or digital advertisements) to user client devices 118 (e.g., via an application or website accessed by the user client devices 118).

As shown, the multi-treatment embedding selection system 102 can be implemented as part of the digital content management system 106. The multi-treatment embedding selection system 102 can utilize a variational autoencoder with a task embedding layer to generate multi-treatment effect estimations for a user client device. The multi-treatment embedding selection system 102 can communicate with the administrator client device 108, the user client devices 118, and the third-party server device(s) 114. Indeed, the multi-treatment embedding selection system 102 can distribute (e.g., via the network 112) data relating to the multi-treatment effect estimations of combinations of treatments. For example, the multi-treatment embedding selection system 102 can provide the multi-treatment to the administrator client device 108 (e.g., for management and review) and to the third-party server device(s) 114 (e.g., for execution).

The multi-treatment embedding selection system 102 can comprise an application running on the server device(s) 104 or a portion of a software application that can be downloaded from the server device(s) 104. For example, the multi-treatment embedding selection system 102 can include a web hosting application that allows the administrator client device 108 and the third-party server device(s) 114 to interact with content hosted on the server device(s) 104. To illustrate, in one or more embodiments of the environment 100, the administrator client device 108 accesses a web page supported by the server device(s) 104.

As shown, the environment 100 can include the administrator client device 108. The administrator client device 108 can set campaign parameters (e.g., target audiences, budget, actions) for a digital content campaign. An administrator can input desired campaign parameters into the administrator client device 108. In one embodiment, the administrator client device 108 can present, to the administrator, options for potential campaign parameters. The administrator client device 108 can receive input from the administrator to set campaign parameters.

As illustrated in FIG. 1, the administrator client device 108 includes an administrator application 110. The administrator application 110 may be a web application or a native application on the administrator client device 108 (e.g., a mobile application, a desktop application, etc.). The administrator application 110 can interface with the multi-treatment embedding selection system 102 to provide digital content to the server device(s) 104, and to present (e.g., display) digital content received from the server device(s) 104. Indeed, the administrator application 110 can receive data from the multi-treatment embedding selection system 102 and can present, for display, a user interface that includes estimated effect and/or recommended treatment data.

The digital content management system 106 stores a repository of digital content, including digital images, digital videos, data graphics, and digital text (e.g., digital content received from the administrator client device 108). Indeed, the digital content management system 106 can distribute digital content for display to a client device (e.g., user client devices 118). The digital content management system 106 can receive, from the administrator client device 108, campaign parameters. Based on the received campaign parameters, the digital content management system 106 can distribute digital content according to user client devices 118 based on set campaign parameters. The digital content management system 106 can also distribute campaign parameters to third-party server device(s) 114. For example, the third-party server device(s) 114 can host a web page (or application) and provide digital content (e.g., advertisements) from the digital content management system 106 via the web page (or application).

Although FIG. 1 depicts the multi-treatment embedding selection system 102 located on the server device(s) 104, in some embodiments, the multi-treatment embedding selection system 102 may be implemented by (e.g., located entirely or in part) on one or more other components of the environment. For example, the multi-treatment embedding selection system 102 may be implemented on a user client device of the user client devices 118 or on the administrator client device 108.

As illustrated in FIG. 1, the environment 100 includes the third-party server device(s) 114. As illustrated in FIG. 1, the third-party server device(s) 114 include a content distribution system 116. Generally, the content distribution system 116 can provide digital content for display to a client device (e.g., user client devices 118). In particular, the content distribution system 116 can provide various digital content to the user client devices 118 through various distribution channels. For example, the content distribution system 116 can provide digital content as part of a website or an application (e.g., a social media application). The server device(s) 104 can provide digital content (e.g., an advertisement) to the third-party server device(s) 114 and the third-party server devices can provide the digital content to the user client device 118a (e.g., insert the advertisement in a website or application of the user client device 118a). Thus, in some embodiments, the server device(s) 104 provide digital content directly to the user client devices 118 while in other embodiments, the server device(s) 104 utilize the third-party server device(s) 114 to provide digital content to the user client devices 118.

In some embodiments, though not illustrated in FIG. 1, the environment 100 may have a different arrangement of components and/or may have a different number or set of components altogether. For example, in one or more embodiments, the environment 100 may exclude the third-party server device(s) 114. In particular, the digital content management system 106 can receive campaign parameters from the administrator client device 108 and distribute digital content directly to the user client devices 118.

Additionally, the administrator client device 108, the user client devices 118, and the third-party server device(s) 114 can communicate directly with the multi-treatment embedding selection system 102, bypassing the network 112. Moreover, the multi-treatment embedding selection system 102 can include one or more databases (e.g., a treatment database) housed on the server device(s) 104 or elsewhere in the environment. Further, the multi-treatment embedding selection system 102 can include one or more machine learning models (e.g., neural networks), and the multi-treatment embedding selection system 102 can be implemented in a variety of different ways across the server device(s) 104, the network 112, the administrator client device 108, the third-party server device(s) 114, and the user client devices 118.

Figure 2A:
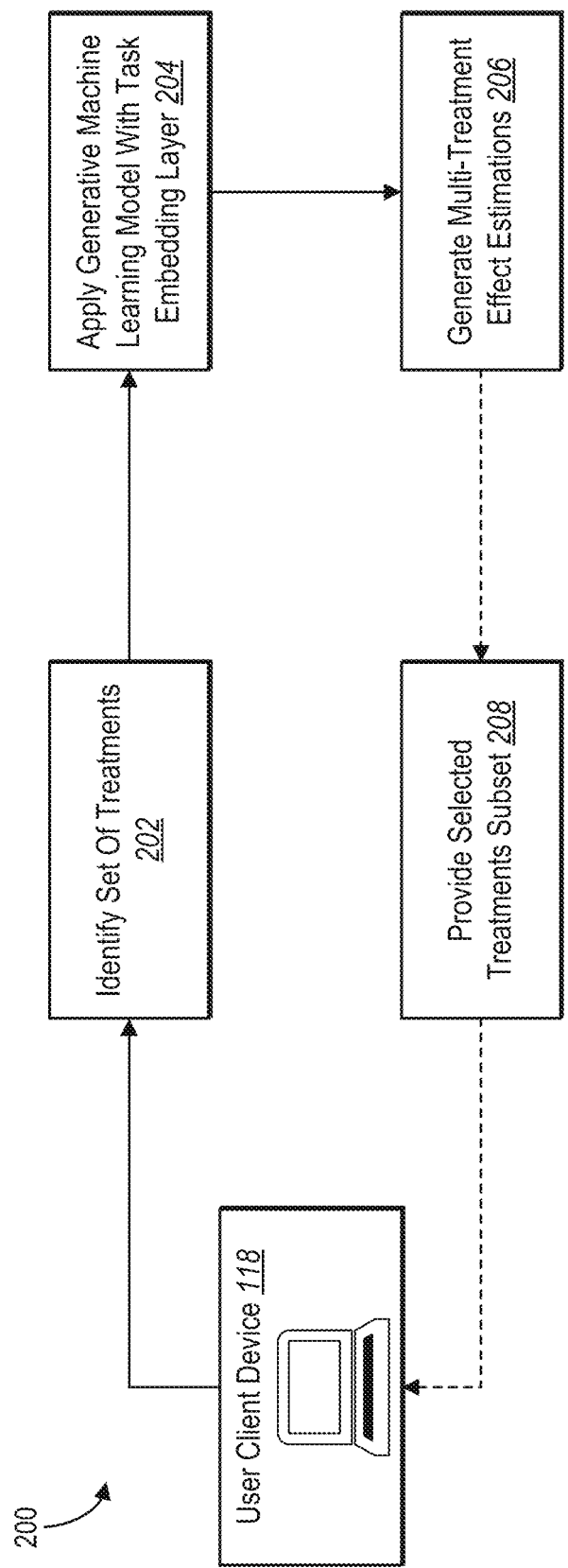
FIG. 2A illustrates generating multi-treatment effect estimations utilizing a generative machine learning model with task embedding layer and providing selected treatment subsets to a client device in accordance with one or more embodiments.

As discussed above, the multi-treatment embedding selection system 102 utilizes a variational autoencoder with a task embedding layer to provide a selected treatment subset to a user client device. FIGS. 2A-2C provide a general overview of how the disclosed multi-treatment embedding selection system 102 provides a selected treatment subset to the user client device 118. In particular, FIG. 2A includes a flow chart illustrating how the multi-treatment embedding selection system 102 provide a selected treatment subset to the user client device 118. FIG. 2B provides a schematic diagram for an example conventional system. FIG. 2C illustrates a schematic diagram of a generative machine learning model utilized by the multi-treatment embedding selection system 102 in accordance with one or more embodiments.

As just mentioned, FIG. 2A illustrates identifying and providing a selected treatment subset to a client device in accordance with one or more embodiments. In particular, FIG. 2A illustrates a series of acts 200 that includes the acts 202-208 of identifying a set of treatments, applying a generative machine learning model with a task embedding layer, generating multi-treatment effect estimations, and providing selected treatment subsets to the user client device 118.

As part of the series of acts 200, the multi-treatment embedding selection system 102 identifies the user client device 118 associated with a user and digital characteristics corresponding to the user client device 118. The multi-treatment embedding selection system 102 can access digital characteristics including online behavior of a user, applications located on the user client device 118, data on advertisements with which the user has interacted, and other usage data. The multi-treatment embedding selection system 102 uses the accessed digital characteristics as input in the variational autoencoder to generate selected treatment subsets.

As illustrated in FIG. 2A, the multi-treatment embedding selection system 102 performs the act 202 of identifying a set of treatments. In general, the multi-treatment embedding selection system 102 accesses possible treatments that can be applied to the user client device 118. For example, the multi-treatment embedding selection system 102 can access administrator input regarding potential treatments to apply to the user client device 118*a*. The multi-treatment embedding selection system 102 can also access a database containing treatments applied in the past to one or more of the user client devices 118.

As illustrated in FIG. 2A, the multi-treatment embedding selection system 102 also performs the act 204 of applying a generative machine learning model with a task embedding layer. The multi-treatment embedding selection system 102 applies the generative machine learning model to find the effects of treatment subsets from the set of treatments. In particular, based on the digital characteristics from the user client device 118 and the identified set of treatments, the generative machine learning model uses the task embedding layer to model treatment subsets.

As further illustrated in FIG. 2A, the multi-treatment embedding selection system 102 performs the act 206 of generating multi-treatment effect estimations (i.e., via the generative machine learning model with the task embedding layer). The multi-treatment embedding selection system 102 generates multi-treatment effect estimations for each particular subset of treatments. The multi-treatment embedding selection system 102 then compares the multi-treatment effect estimations for the various subsets of treatments. Based on comparing the subsets of treatments, the multi-treatment embedding selection system 102 selects a treatment subset. For example, the multi-treatment embedding selection system 102 can select the treatment subset with the highest estimated conversion rate.

As shown in FIG. 2A, the multi-treatment embedding selection system 102 performs the act 208 of providing the selected treatment subset to the user client device 118. In particular, the multi-treatment embedding selection system 102 applies the selected treatment subset corresponding to the highest estimated conversion rate to the user client device.

As mentioned above, the multi-treatment embedding selection system 102 utilizes a trained generative machine learning model with a task embedding layer to efficiently generate multi-treatment effect estimations. The task embedding layer enables the multi-treatment embedding selection system 102 to operate more efficiently than conventional systems. FIG. 2B illustrates a schematic diagram of a neural network utilized by conventional systems. FIG. 2B includes a treatment combinations chart 210. Additionally, FIG. 2B illustrates a conventional neural network 218 comprising digital characteristics 212 (i.e., digital characteristics denoted as "x"), an estimated effect 214 (i.e., a multi-treatment effect estimation denoted as "y"), and treatment layers 216*a*-216*e*.

As illustrated in FIG. 2B, the treatment combinations chart 210 illustrate possible treatment combinations. In particular, each number (e.g., 1, 2, 3, 4, and 5) denotes an individual treatment. FIG. 2B illustrates a number of possible combinations for treatments 1-5. For example, a first treatment subset comprises treatments 1 and 2. For a set of treatments that comprises five treatments, as illustrated, there are 32 possible treatment subsets.

As illustrated in FIG. 2B, conventional systems using conventional neural networks 218 generate the estimated effect 214 for treatment subsets by using a private layer or channel (e.g., a channel comprising a plurality of private layers devoted to the particular treatment subset) for each treatment in the treatment subset. As illustrated, the conventional neural network 218 generates the estimated effect 214 for the treatment subset including treatments 1-5 by using a private layer for each treatment in the treatment subset. In particular, the conventional neural network 218 includes a first treatment layer 216a, a second treatment layer 216b, a third treatment layer 216c, a fourth treatment layer 216d, and a fifth treatment layer 216e. Because the conventional neural network 218 uses a private layer for each treatment, the conventional neural network 218 is unsuitable for situations in which there is a large number of treatments. In particular, extending the conventional neural network 218 to multiple treatments explodes the network size and hence the number of parameters to be learnt. Furthermore, the situation becomes worse when a subset of treatments can be applied simultaneously since the number of possible subsets is exponential in number of available treatments. Thus, increasing the number of treatments exponentially increases the number of network parameters and training data required. See Christos Louizos, Uri Shalit, Joris M Mooij, David Sontag, Richard Zemel, and Max Welling, Causal effect inference with deep latent-variable models, Advances in Neural Information Processing Systems. 6446-6456 (2017) (hereinafter "Louizos"), incorporated herein by reference.

In contrast to the conventional neural network 218 illustrated in FIG. 2B, the multi-treatment embedding selection system 102 uses a variational autoencoder 222 (or other generative machine learning model) with a task embedding layer 224 to generate the estimated effect 214 based on the digital characteristics 212. For example, as illustrated in FIG. 2C, the multi-treatment embedding selection system 102 uses a single channel within the variational autoencoder 222 to generate the estimated effect 214 for multiple treatments. While the conventional neural network 218 uses private channels for each treatment, the multi-treatment embedding selection system 102 utilizes the task embedding layer 224 to incorporate the effect of multiple treatments within a treatment subset by using a task embedding model. Thus, even as the number of treatments increases, the network size does not explode as does the conventional neural network 218 illustrated in FIG. 2B. In particular, as the number of treatments increases, the multi-treatment embedding selection system 102 uses the task embedding layer 224 to incorporate the additional treatments.

For example, in one or more embodiments, the multi-treatment embedding selection system 102 utilizes a variational autoencoder similar to Louizos; however, instead of having separate paths for various treatments, the multi-treatment embedding selection system 102 utilizes a one-path approach for multiple treatments using task embedding. A one-path approach avoids exploding the network size, reduces the number of parameters to be learnt, and lowers the volume of training data needed.

The multi-treatment embedding selection system 102 both trains the variational autoencoder 222 and applies the variational autoencoder 222. The multi-treatment embedding selection system 102 trains the variational autoencoder 222 by inputting digital characteristics, training treatments, and known outcomes of the treatments (i.e., training effects). The multi-treatment embedding selection system 102 learns the network parameters. During inference (i.e., application), the multi-treatment embedding selection system 102 inputs the set of observed variables x and the desired treatment subsets. The multi-treatment embedding selection system 102 uses the learned network parameters of the trained variational autoencoder 222 to generate the estimated effects. The discussion accompanying the subsequent figures includes additional detail pertaining to the training and application of the variational autoencoder 222.

Figure 3:
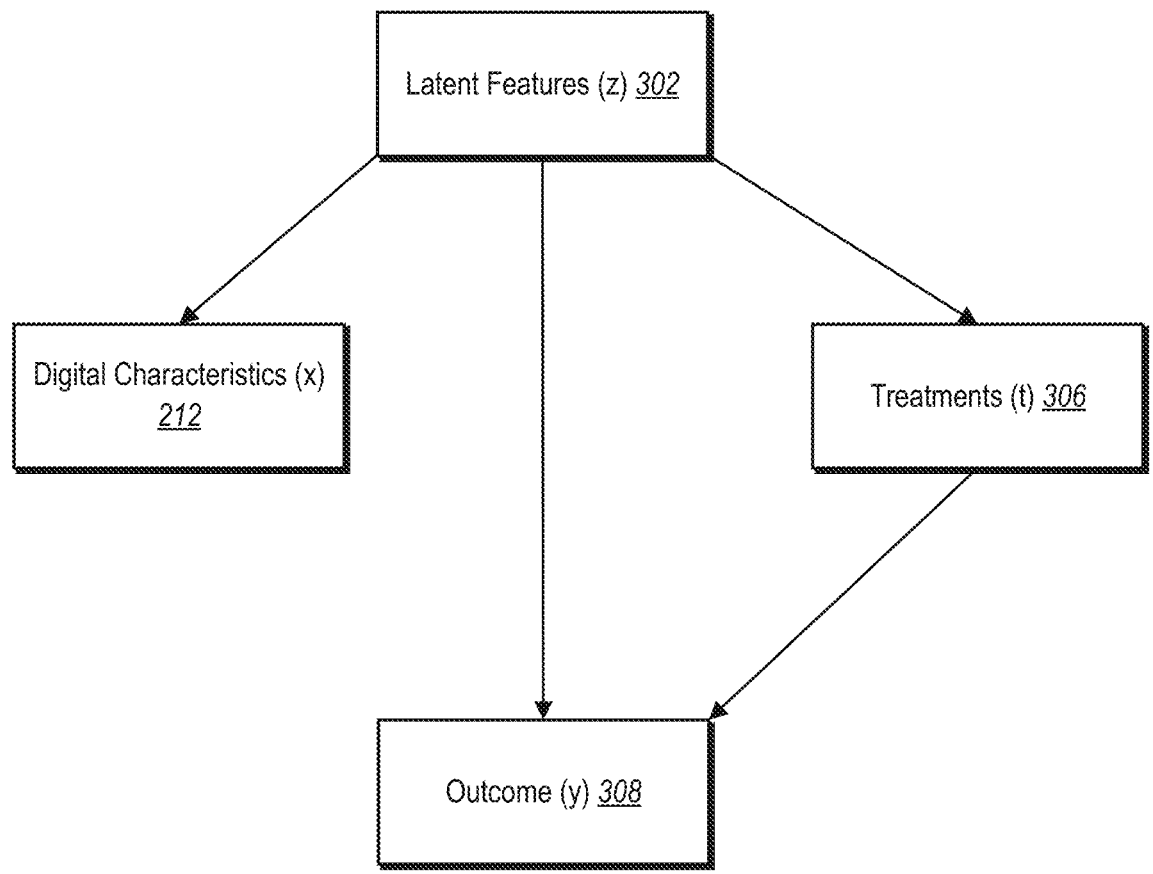
FIG. 3 illustrates a schematic diagram showing latent features, digital characteristics, treatments, and outcomes in accordance with one or more embodiments.

As mentioned above, the multi-treatment embedding selection system 102 analyzes a number of factors that impact the multi-treatment effect estimation for a subset of treatments. FIG. 3 illustrates a causal graph depicting the factors that are causally linked to an estimated effect. FIG. 3 includes latent features 302 (denoted as "z"), digital characteristics 212, treatments 306 (denoted as "t"), and outcome 308 (i.e., a treatment effect). As illustrated in FIG. 3, the latent features 302 and the treatment 306 influence the outcome 308 (e.g., unknown preferences or features together with treatment include the treatment effect). Additionally, the latent features 302 influence the digital characteristics 212 (e.g., unknown preferences of individual client device users impact the digital characteristics, such as online activity, corresponding to the client device).

FIG. 3 depicts latent features 302. As illustrated, the latent features 302 (labeled as "z" in FIG. 3) influence the outcome 308 (e.g., the effect, labeled as "y") and also determine what combination of treatments 306 (labeled as "t") should be applied. In particular, latent features 302 are unobserved features that confound both the digital characteristics 212 and the treatments 306. Latent features 302 include unobserved intent or purposes guiding observable online behavior or digital characteristics. The latent features 302 can directly affect the outcome 308. Additionally, the latent features 302 can also interact with the treatment 306 to confound the outcome 308.

As illustrated in FIG. 3, the digital characteristics 212 represent observed digital characteristics that correspond to a user associated with a user client device. Treatments 306 represent the treatments that the multi-treatment embedding selection system 102 can apply to the user client device. Treatments can consist of actions, such as digital content that the multi-treatment embedding selection system 102 can provide via distribution channels to client devices. Treatments 306 can represent a single treatment or a combination of treatments.

FIG. 3 illustrates the outcome 308. The outcome 308 represents resulting characteristics of the client device after the treatment 306 has been applied to the client device. For example, the outcome 308 can represent the conversion rate (e.g., rate of a desired outcome such as clicks, purchases, views, or visits) of a user associated with the user client device. The multi-treatment embedding selection system 102 generates predicted outcomes (i.e., estimated treatment effects) for selected treatment subsets.

Unlike conventional systems, the multi-treatment embedding selection system 102 accounts for interactions between the latent features 302, the digital characteristics 212, and the treatments 306. The multi-treatment embedding selection system 102 takes into account the fact that latent features 302 do not only guide digital characteristics 212 (e.g., online behavior) but also a choice of the treatments 306. Because conventional systems often predict outcomes 308 based solely on digital characteristics 212 (i.e., observed behaviors), conventional systems often fail to account for interactions between latent features 302 and treatments 306.

Figure 4:
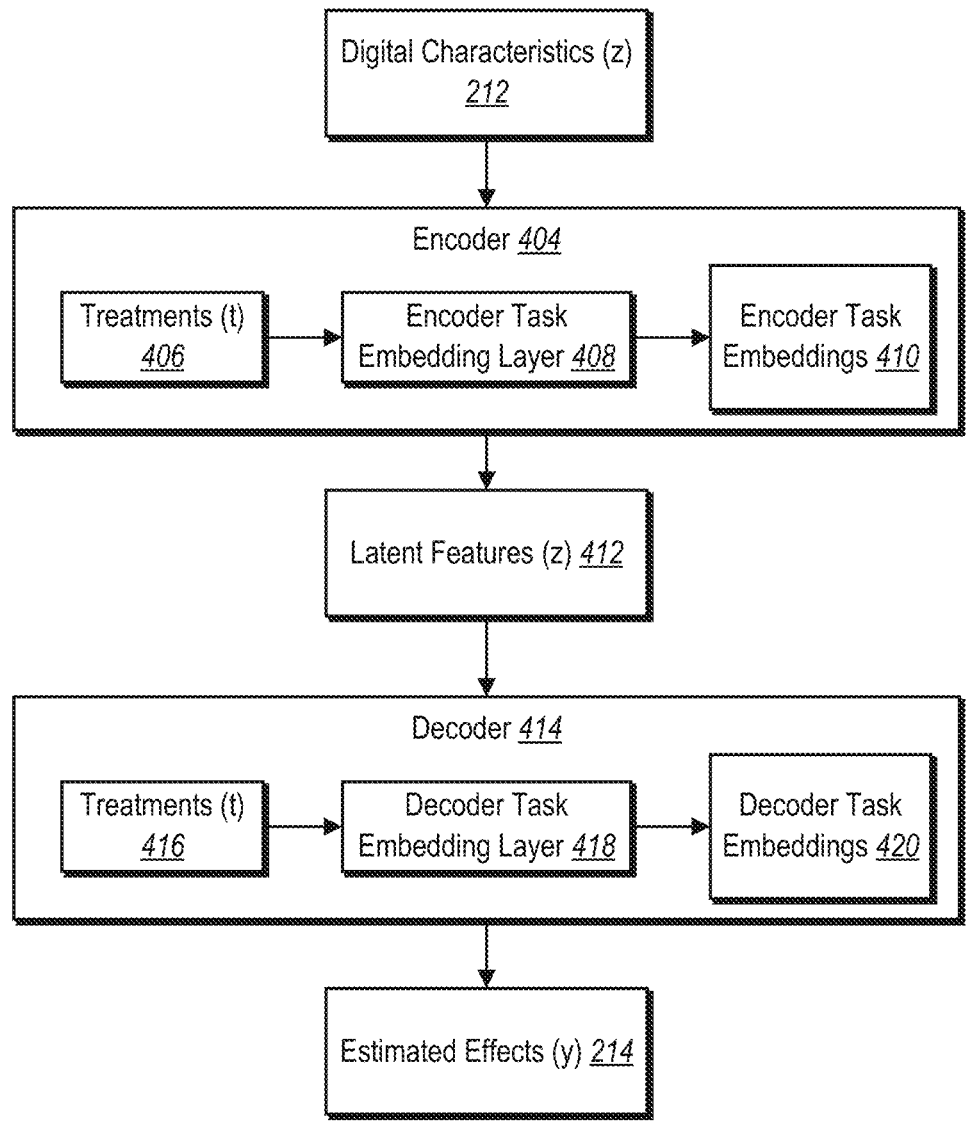
FIG. 4 illustrates generating multi-treatment effect estimations using a generative machine learning model with task embedding layer in accordance with one or more embodiments.

As discussed above, the multi-treatment embedding selection system 102 can utilize a variational autoencoder to generate the estimated effects of a subset of treatments for a user client device. Moreover, in one or more embodiments, the variational autoencoder comprises an encoder and a decoder. FIG. 4 illustrates generating estimated effects for treatments using an encoder and a decoder in accordance with one or more embodiments. In particular, FIG. 4 illustrates inputting digital characteristics 212 into an encoder 404. The encoder 404 generates latent features 412. The multi-treatment embedding selection system 102 additionally inputs the latent features 412 into decoder 414 to generate the estimated effects 214. FIG. 4 illustrates the functions of the encoder 404 and the decoder 414 during an application event (e.g., application of a variational autoencoder).

Generally, as illustrated in FIG. 4, the variational autoencoder uses the encoder 404 and the decoder 414 to mimic the dependencies among the digital characteristics 212, latent features 412, and treatments to estimate the outcome. More specifically, the encoder 404 uses the digital characteristics 212 and a selected treatment subset 406 as input to estimate the distribution of the latent features 412. The encoder 404 accomplishes this by passing the treatments 406 through an encoder task embedding layer 408 to generate encoder task embeddings 410. In particular, the multi-treatment embedding selection system 102 applies an embedding matrix to the treatments 406 to generate the encoder task embeddings 410.

The encoder 404 uses the encoder task embeddings 410 to generate the latent features 412. In particular, the multi-treatment embedding selection system 102 concatenates the encoder task embeddings 410 with the digital characteristics 212. The multi-treatment embedding selection system 102 computes the latent features 412 by estimating a joint distribution using the digital characteristics 212 input and the encoder task embeddings 410.

As further illustrated in FIG. 4, the multi-treatment embedding selection system 102 uses the latent features 412 as input to the decoder 414 to generate the estimated effects 214. The decoder 414 uses the latent features 412 and the observed digital characteristics 212 to generate decoder task embeddings 420. In particular, the decoder 414 applies the same embedding matrix utilized in the encoder task embedding layer 408 in a decoder task embedding layer 418. The decoder task embedding layer 418 uses the treatments 416 and the latent features 412 to generate decoder task embeddings 420. The decoder 414 uses the decoder task embeddings 420 to generate the estimated effects 214.

In one or more embodiments, during application of the variational autoencoder, the treatments 406 and the treatments 416 are the same (e.g., a subset of treatments being analyzed to determine an estimated treatment effect). Moreover, in such embodiments the encoder task embeddings 410 and the decoder task embeddings 420 can also be the same. Indeed, in one or more embodiments, during application of the variational autoencoder, the multi-treatment embedding selection system 102 utilizes the encoder task embeddings 410 as the decoder task embeddings 420 (e.g., without applying the decoder task embedding layer 418).

Figure 5A:
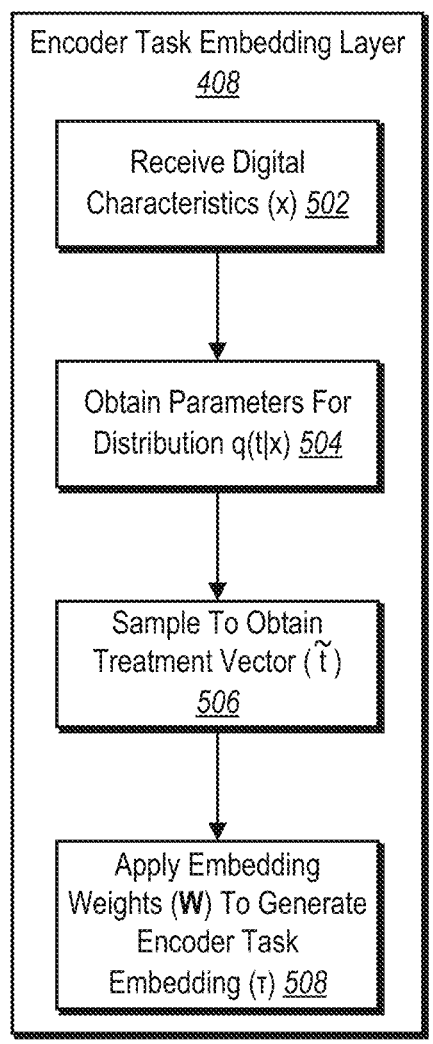
FIGS. 5A-5B illustrate utilizing an encoder and decoder of a generative machine learning model to generate task embeddings in accordance with one or more embodiments.
Figure 5B:
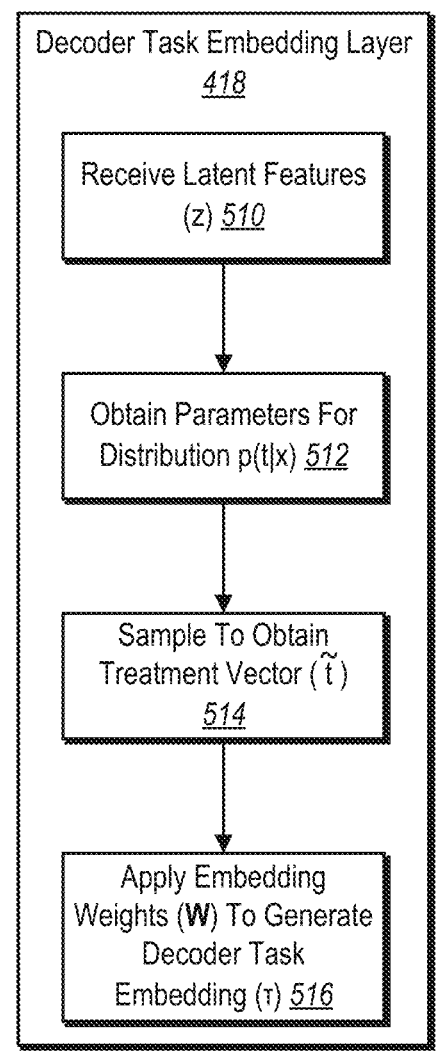

As discussed previously, the multi-treatment embedding selection system 102 can also train the variational autoencoder 222. As part of training the variational autoencoder, the multi-treatment embedding selection system 102 can determine treatment effects by modeling and estimating the joint probability distribution of digital characteristics, treatments, latent features, and outcomes. FIGS. 5A and 5B illustrate training the variational autoencoder 222, including the encoder 404 and the decoder 414 in accordance with one or more embodiments. FIG. 5A, in particular, illustrates generating the encoder task embeddings 410 via the encoder task embedding layer 408 in accordance with one or more embodiments. FIG. 5B illustrates generating the decoder task embeddings 420 via the decoder task embedding layer 418 in accordance with one or more embodiments.

As shown in FIG. 5A, to generate the encoder task embedding, the multi-treatment embedding selection system 102 (via the encoder task embedding layer 408) performs an act 502 of receiving digital characteristics x. Based on the digital characteristics x, the multi-treatment embedding selection system 102 performs the act 504 of obtaining parameters for distribution $q(t|x)$. In particular, the multi-treatment embedding selection system 102 utilizes the encoder task embedding layer 408 to generate the distribution $q(t|x)$. The distribution $q(t|x)$ reflects the probability of a set of treatments, t, given the digital characteristics x. Additional detail regarding the act 504 of obtaining parameters for distribution $q(t|x)$ will be provided below (e.g., in relation to FIGS. 6A-6B).

As shown in FIG. 5A, the multi-treatment embedding selection system 102 also utilizes the encoder task embedding layer 408 to perform the act 506 of sampling to obtain a treatment vector (denoted as "$\tilde{t}$"). In particular, in one or more embodiments, the multi-treatment embedding selection system 102 utilizes the encoder task embedding layer 408 during training to sample from the distribution $q(t|x)$ to obtain the treatment vector $\tilde{t}$. For example, the distribution $q(t|x)$ might be (0.25, 0.3, 0.2, 0.25) where each of the four values represents the probability of a particular treatment given digital characteristics x. The multi-treatment embedding selection system 102 takes a number of samples (e.g., 10, 50, 100, etc.) of the distribution of the five treatments (e.g., by sampling according the probability distribution 0.25. 0.3, 0.02, 0.025). The treatment vector $\tilde{t}$ represents the combination of treatments into k'-dimensional space where k equals the number of actions. In other words, each element in the treatment vector $\tilde{t}$ comprises a binary variable indicating whether a particular treatment is part of the considered combination of treatments.

As illustrated in FIG. 5A, the multi-treatment embedding selection system 102 also performs the act 508 of applying embedding weights (denoted as "W") to generate an encoder task embedding. Specifically, the multi-treatment embedding selection system 102 utilizes the encoder task embedding layer 408 to apply embedding weights in an embedding matrix W to the treatment vector $\tilde{t}$ to generate the encoder task embedding $\tau$ in the act 508. Specifically, the multi-treatment embedding selection system 102 appropriately adjusts the dimensions of the embedding matrix to scale the model for a large number of treatments. The task embedding $\tau$ accounts for the relationship between treatments in the subset of treatments.

Though not illustrated in FIG. 5A, during application, the encoder task embedding layer 408 need not sample the distribution $q(t|x)$ to obtain the treatment vector, E. Instead, during application, multi-treatment embedding selection system 102 can generate the effect of a particular combination of treatments t'. Thus, rather than obtaining parameters for the distribution $q(t|x)$ and sampling the distribution $q(t|x)$ to obtain the treatment vector $\tilde{t}$, the multi-treatment embedding selection system 102 can use the combination of treatments t' in place of the sampled treatment vector, $\tilde{t}$. The multi-treatment embedding selection system 102, in act 508, applies embedding weights to the combination of treatments t' to generate the state embedding $\tilde{t}$.

As mentioned, the multi-treatment embedding selection system 102 can also generate decoder task embeddings via a decoder of a variational autoencoder. FIG. 5B illustrates the multi-treatment embedding selection system 102 utilizing the decoder task embedding 418 to generate a decoder task embedding. Specifically, FIG. 5B illustrates the acts 510-516 of receiving latent features, obtaining parameters for a distribution of the probability of treatments t given latent features z (p(t|z)), sampling the distribution p(t|z) to obtain the treatment vector t̃, and applying embedding matrix W to generate decoder embedding τ.

As discussed above, the multi-treatment embedding selection system 102 can perform the act 510 of receiving latent features by identifying the latent features from the encoder of the variational autoencoder. The multi-treatment embedding selection system 102 then performs the act 512 of obtaining parameters for distribution. Specifically, the multi-treatment embedding selection system 102 determines (p(t|z) (i.e., the conditional probability of the treatment t given the latent features z).

Moreover, as illustrated, the multi-treatment embedding selection system 102 performs the act 514 of sampling to obtain a treatment vector t̃. In particular, as described above, the multi-treatment embedding selection system 102 samples the distribution p(t|z) to obtain the treatment vector E. Further, the multi-treatment embedding selection system 102 performs the act 516 of applying embedding weights to generate the task embedding. In particular, the multi-treatment embedding selection system 102 transforms the treatment vector t to the decoder embedding τ. Specifically, as illustrated, the multi-treatment embedding selection system 102 applies embedding matrix W to generate the embedding τ.

As with the encoder network, the decoding network obtains parameters for and samples the distribution p(t|z) during training. On the other hand, during application, the multi-treatment embedding selection system 102 can identify estimated effects of a particular treatment combination t'. Thus, similar to the encoder network, the decoder network directly passes the treatment combination t', which is transformed into the state embedding τ. In some embodiments, during application the decoder task embedding layer 418 utilizes the task embedding generated by the encoder task embedding layer 408 (e.g., the task embedding generated at the act 508).

Figure 6A:
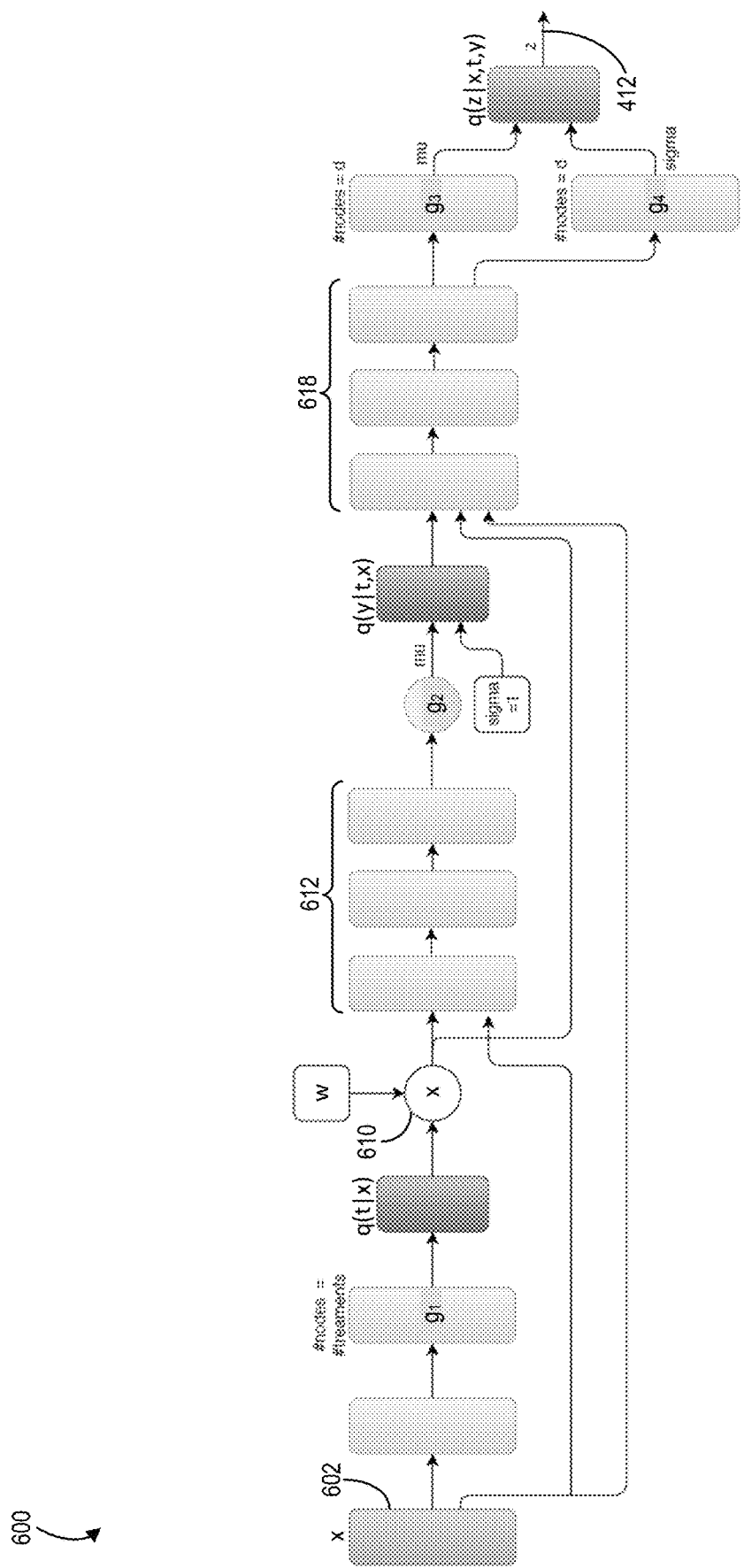
FIGS. 6A-6B illustrate utilizing a machine learning model comprising a task embedding layer to generate multi-treatment effect estimations in accordance with one or more embodiments.
Figure 6B:
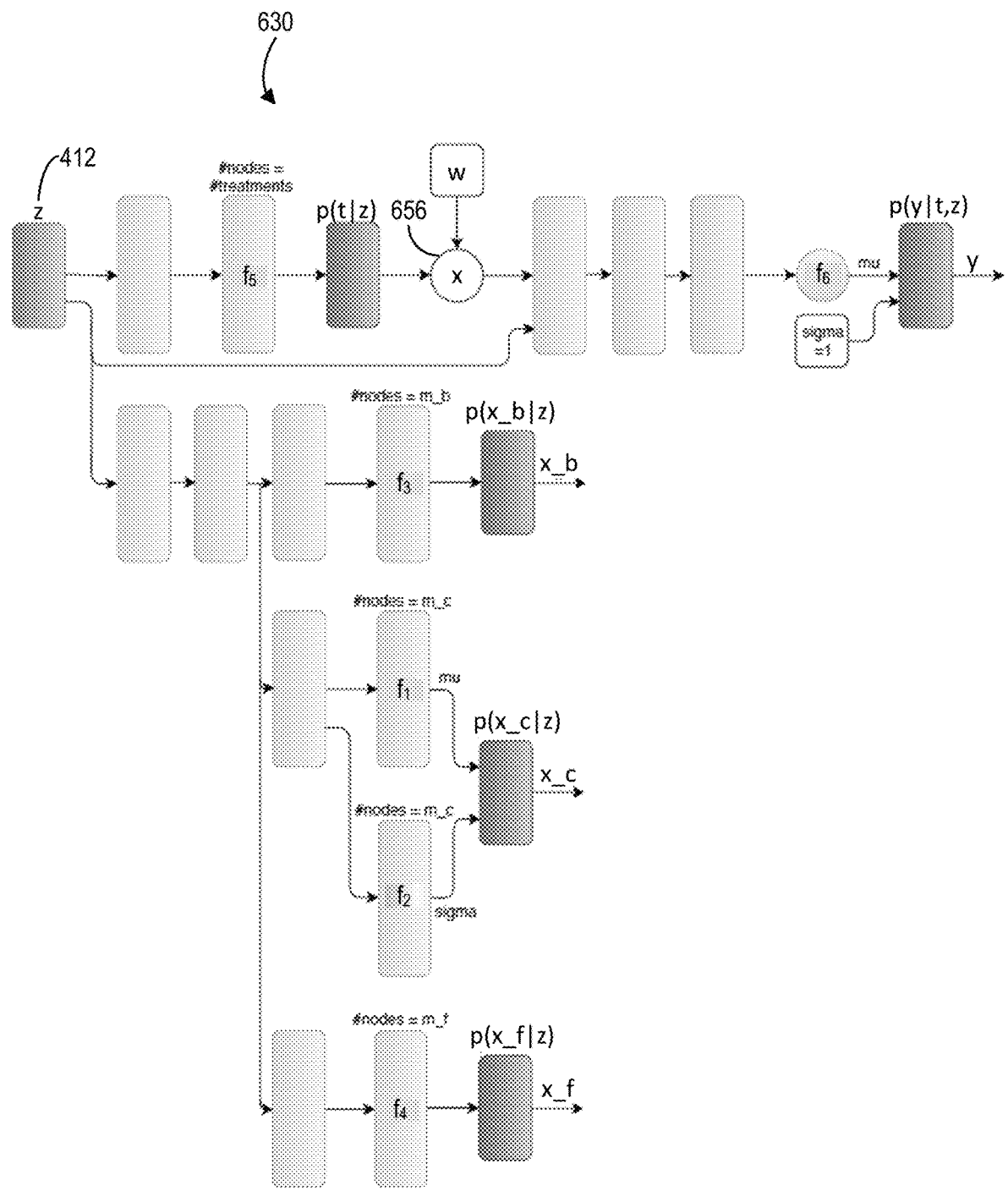

FIGS. 6A and 6B illustrate schematic diagrams of the variational autoencoder utilized by the multi-treatment embedding selection system 102. FIG. 6A illustrates the encoder network that inputs digital characteristics x to generate the distribution for latent features, z. FIG. 6B illustrates the decoder network that takes input latent features, z, to reconstruct the digital characteristics x, and the estimated effects y.

Generally, the multi-treatment embedding selection system 102 recovers estimated effects y by generating joint probability distribution of latent features z, digital characteristics x, treatments t, and estimated effects y (p(z,x,t,y)). The multi-treatment embedding selection system generates the joint probability distribution p(z,x,t,y) by determining the product of the following probability distributions: the probability of treatments t given latent features z (p(t|z)), the probability of digital characteristics x given latent features z (p(x|z)), the probability of estimated effects y given treatments t and latent features z (p(y|t,z)), and the probability of latent features z (p(z)). As will be discussed in additional detail below with respect to FIGS. 6A-6B, the multi-treatment embedding selection system utilizes the variational autoencoder to generate the above-listed probability distributions.

Each of the variables including treatments t, digital characteristics x, and latent features z will be discussed in the following paragraphs. The multi-treatment embedding selection system generates the estimated effects of applying some subset of treatments to a user client device associated with a user. The multi-treatment embedding selection system uses treatment t to represent a particular subset of treatments that are applied to the user. Treatment t is a k-dimensional vector where k represents the number of treatments in a set of treatments (i.e., available treatments). Each element in the treatment t vector is a binary variable indicating whether the particular treatment is part of the considered subset of treatments.

Digital characteristics x comprises proxy variables m. In particular, proxy variables m can be continuous, categorical, or binary. Continuous digital characteristics are represented by $x_c$, categorical digital characteristics are represented by $x_f$, and binary digital characteristics are represented by $x_b$. Similarly, the number of variables in each digital characteristic variable is denoted by $m_c$, $m_f$, and $m_b$ respectively.

Latent features z represents hidden or unobserved confounders. In particular, latent features z variable is a d length vector where d represents a hyperparameter of the variational autoencoder.

As discussed above, FIG. 6A illustrates an encoder network 600 taking the digital characteristics x (e.g., digital characteristics 212) to generate the distribution for latent features z (e.g., the latent features 412). In general, the encoder network 600 includes an input layer 602 that feeds into additional network layers that contain the network parameters to be trained. In particular the encoder network 600 includes multiple layers that analyze features of the inputs at different levels of abstraction to generate the latent features z.

The posterior of latent features z depends on digital characteristics x, estimated effects y, and treatments t. Different parts of the encoder compute different probability distributions. The multi-treatment embedding selection system 102 uses the input layer 602 to receive the digital characteristics x. As illustrated in FIG. 6A, a layer of the encoder network 600 analyzes features of the digital characteristics x. In particular, the treatment t is modeled as a vector of k Bernoulli random variables which are independent given x. Using digital characteristics x, the encoder network 600 obtains parameters for distribution q(t|x) through g1.

$$q(t \mid x) = \prod_{i=1}^{k} Bern(q_{t,i}), \, q_{t,i} = g_1$$

As discussed above with respect to FIG. 5A, the multi-treatment embedding selection system 102 samples the distribution q(t|x) to obtain a treatment vector t̃. During embedding, the multi-treatment embedding selection system 102 applies an embedding matrix W to the treatment vector t̃. More specifically, the multi-treatment embedding selection system 102 achieves a transformation of a treatment vector t̃ by projecting k-dimensional treatment vector which represents combinations of treatments into k'-dimensional space ($\tau \in R^{k'}$) using the embedding matrix W ($W \in R^{k' \times k}$). The embedding weights utilized by the embedding matrix W are learned with the task (e.g., learned in training) and the dimension k' of the task embedding vector is a hyperparameter of the model. By appropriately adjusting the dimensions of embedding matrix W, the encoder network 600 scales well for large numbers of treatments. By applying the embedding matrix W to the treatment vector t̃, the multi-treatment embedding selection system 102 generates an embedding τ for the treatment vector t̃. The use of task embedding accounts for the relationship between treatments.

After finding the embedding τ, the multi-treatment embedding selection system 102 concatenates the embedding τ with digital characteristics input x (illustrated as an act 610 in FIG. 6A) and feeds the concatenation to the network layers 612 to obtain parameters for the distribution q(y|t,x) through $g_2$. For continuous outcomes y, the multi-treatment embedding selection system 102 represents distribution q(y|t,x) as $N(\mu_{y_q}, 1)$. In case of binary outcomes y, the parameters for the distribution q(y|t,x) are approximated with a Bernoulli distribution. The multi-treatment embedding selection system 102 samples outcome vector ŷ from the distribution q(y|t,x).

$$q(y|t,x) = \mathcal{N}(\mu_{y_q}, 1), \mu_{y_q} = g_2, \tau = W\tilde{t}$$

Finally, to compute the latent features z, the multi-treatment embedding selection system 102 estimates the mean and variance using the outcome vector ŷ, the digital characteristics input x, and the embedding τ using the network layers 618. The output $\mu_{z,i}$ follows from g3 and the output $\sigma_{z,i}$ follows from g4.

$$q(z|x,t,y) = \prod_{i=1}^{d} \mathcal{N}(\mu_{z,i}, \sigma_{z,i}), \mu_{z,i}, \sigma_{z,i} = g_3, g_4$$

As discussed previously, the joint probability distribution required to generate the estimated effect y is the product of the probability distributions p(x|z), p(t|z), p(y|t,z), and p(z). Of these four terms, the encoder network 600 determines the distribution of latent features p(z). The decoder network can estimate the remaining three terms.

FIG. 6B illustrates the architecture of the decoder network 630 utilized by the multi-treatment embedding selection system 102. Generally, the decoder network 630 receives, as input, latent features z (e.g., the latent features 412) to reconstruct the digital characteristics x and the multi-treatment effect estimation y (e.g., the estimated effect 214). More particularly, the decoder network 630 generates the remaining required probability distributions p(x|z), p(t|z), and p(y|t,z).

In at least one embodiment, the multi-treatment embedding selection system 102 treats the latent features z as independent, univariate normal variables. As illustrated in FIG. 6B, the multi-treatment embedding selection system 102 differentiates between continuous digital characteristics ($x_c$), categorical digital characteristics ($x_f$), and Bernoulli digital characteristics ($x_b$). The multi-treatment embedding selection system 102 can treat the random digital characteristics within $x_c$, $x_f$ and $x_b$ as independent of each other given the latent features z. Every digital characteristic in $x_c$ is taken to be a univariate normal given the latent features z. Every digital characteristic in $x_b$ is represented as a Bernoulli, every variable in $x_f$ is a categorical random digital characteristic that is independent of others conditioned on the latent features z.

As with the encoder network 600, different parts of the decoder network 630 predict different distributions. As illustrated in FIG. 6B, the multi-treatment embedding selection system 102 inputs latent features z into the decoder network 630 to obtain parameters for distribution of digital characteristics x given latent features z. For example, the multi-treatment embedding selection system 102 uses $f_3$ to produce parameters for distribution of Bernoulli digital characteristics $p(x_b|z)$. The multi-treatment embedding selection system 102 obtains parameters for distribution of continuous digital characteristics $p(x_c|z)$ through $f_1$ and $f_2$ respectively. Additionally, the multi-treatment embedding selection system 102 uses $f_4$ to produce parameters for categorical digital characteristics $p(x_f|z)$. More specifically, the multi-treatment embedding selection system 102 uses the following functions to produce the above-mentioned distribution parameters:

$$p(x_b|z) = \prod_{i=1}^{m_b} Bern(p_{x,i}), \quad p_{x,i} = f_3$$

$$p(x_c|z) = \prod_{i=1}^{m_c} \mathcal{N}(\mu_{x,i}, \sigma_{x,i}), \mu_{x,i}, \sigma_{x,i} = f_1, f_2$$

$$p(x_f|z) = \prod_{i=1}^{m_f} Cat(q_{x,i}), \quad q_{x,i} = f_4$$

The multi-treatment embedding selection system 102 samples $x_b$, $x_c$, and $x_f$ from the distributions $p(x_b|z)$, $p(x_c|z)$, and $p(x_f|z)$ respectively to obtain digital characteristic vector x̃.

Similar to the encoder network 600, the treatment vector t is represented by k Bernoulli random variables which are independent given z. The conditional probability p(t|z) 642 is given by:

$$p(t|z) = \prod_{i=1}^{k} Bern(p_{t,i}), \quad p_{t,i} = f_5$$

The multi-treatment embedding selection system 102 samples conditional probability p(t|z) to obtain t̂. For continuous estimated effects y, the multi-treatment embedding selection system represents p(y|t,z) as $\mathcal{N}(\mu_{y_p}, 1)$, and in case of binary estimated effects y, the multi-treatment embedding selection system 102 approximates with a Bernoulli distribution.

In order to obtain the distribution p(y|x,t,z), the multi-treatment embedding selection system 102 transforms the sampled t to decoder embedding τ using embedding matrix W (e.g., the same embedding matrix utilized in the encoder network 600). The multi-treatment embedding selection system 102 concatenates digital characteristics x, latent features z, and decoder embedding τ into a single vector (illustrated as an act 656 in FIG. 6B) which is then used to output parameters for p(y|t,z) via $f_6$.

$$p(y|t,z) = \mathcal{N}(\mu_{y_p}, 1), \mu_{y_p} = f_6$$

Using the distributions q(z|x,t,y), p(x|z) (i.e., (p(x_b|z), p(x_c|z), and p(x_f|z) as illustrated in FIG. 6B) p(t|z), and p(y|t,z), the multi-treatment embedding selection system 102 computes the joint probability distribution p(z,x,t,y). The multi-treatment embedding selection system 102 uses the joint probability distribution p(z,x,t,y) to generate the estimated effect y.

The multi-treatment embedding selection system 102 uses variational inference to train the encoder network 600 and the decoder network 630. As discussed above, the multi-treatment embedding selection system 102 uses the encoder network 600 and the decoder network 630 of the variational autoencoder to train network parameters and apply the network parameters. During training, the multi-treatment embedding selection system 102 samples from q(t|x) and p(y|t,z). However, during application, the multi-treatment embedding selection system 102 finds the effect of a particular combination of treatments t' by directly passing t', which will be transformed to a state embedding, instead of sampling from the distributions q(t|x) and p(y|t,z).

The multi-treatment embedding selection system 102 can select a particular subset or combination of treatments from a set of treatments to provide to the user client devices 118. In particular, the multi-treatment embedding selection system 102 can use the variational autoencoder to determine the joint probability distribution p(z,x,t,y) for a plurality of treatment subsets. Based on the joint probability distribution, the multi-treatment embedding selection system 102 generates an outcome y for each subset of treatments in the plurality of treatment subsets. The multi-treatment embedding selection system 102 can compare the generated outcomes y for each of the treatment subsets and identify the subset of treatments corresponding to the highest y value. For example, the outcome y may represent a probability of conversion. Thus, the multi-treatment embedding selection system 102 can recommend, to an administrator via the administrator client device, a subset of treatments to apply to the client device.

Figure 7:
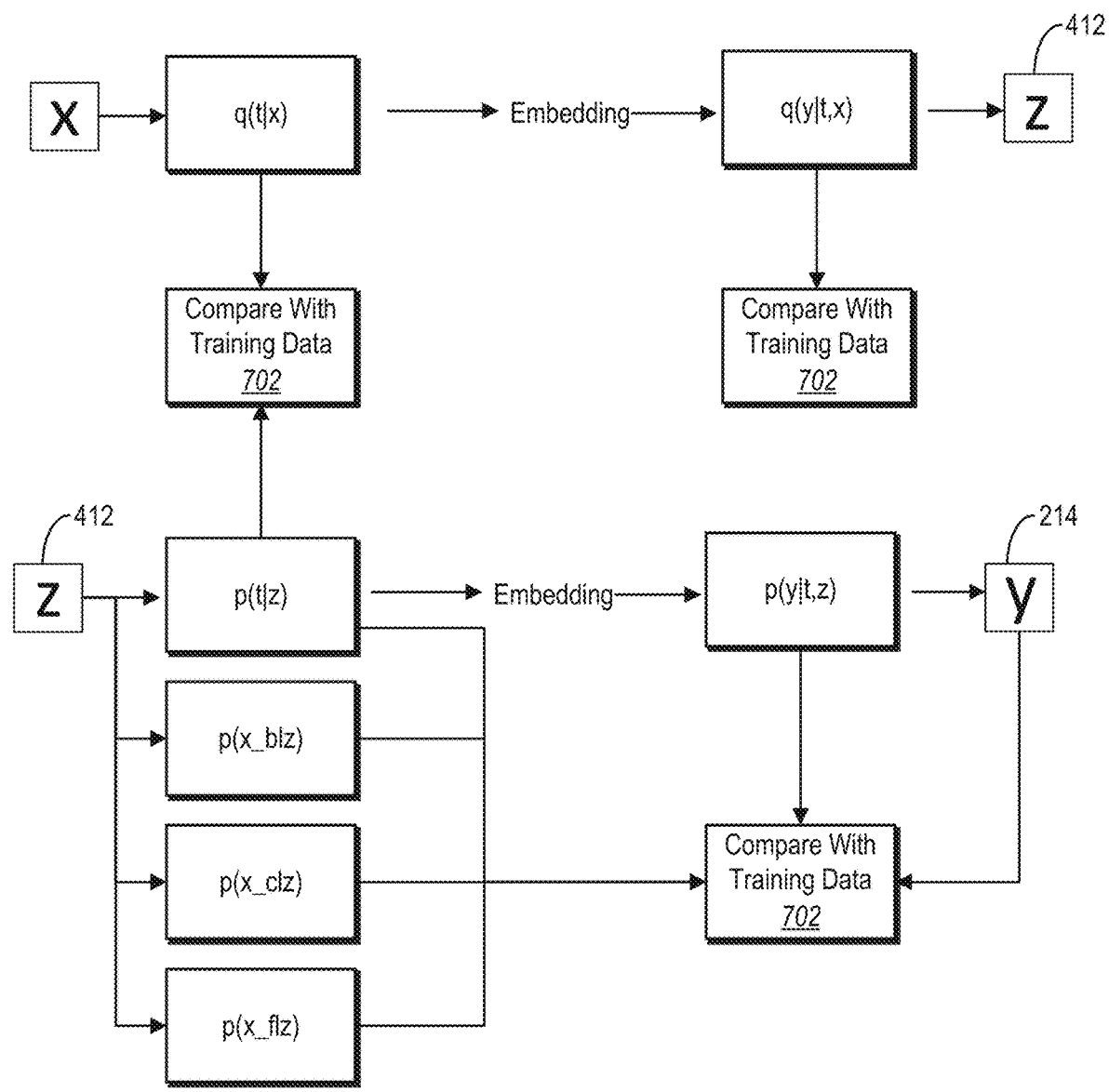
FIG. 7 illustrates training a machine learning model comprising a task embedding layer in accordance with one or more embodiments.

As described above, the multi-treatment embedding selection system 102 trains the network parameters of the variational autoencoder. Generally, the multi-treatment embedding selection system 102 minimizes the loss to estimate the model. FIG. 7 illustrates a schematic diagram of utilizing a loss function during training. During training, the multi-treatment embedding selection system 102 compares predicted distributions with training data. Training data can comprise training characteristic sets that correspond to training client devices, training treatments, and training effects. In particular, training characteristic sets correlate to digital characteristics of training client devices. Training treatments are applied to the training client devices. Training effects include the outcome of applying the training treatments to the training client devices. FIG. 7 illustrates the probability distributions that the multi-treatment embedding selection system 102 compares with the training data to train network parameters.

As illustrated in FIG. 7, during training, the multi-treatment embedding selection system 102 is given digital characteristics x, treatments t, and outcome y. Through the training operation, the multi-treatment embedding selection system 102 models latent features z for the digital characteristics x. During the application operation, the multi-treatment embedding selection system 102 receives digital characteristics x of the client device and a proposed treatment t to apply to the client device. The multi-treatment embedding selection system 102 utilizes the modeled latent features z of the digital characteristics x to generate the predicted outcome y.

The multi-treatment embedding selection system 102 compares the probability distributions generated by the encoder network 600 with training data. As illustrated in FIG. 7, the multi-treatment embedding selection system 102 receives training characteristics as digital characteristics input x. Using the functions described above with respect to FIG. 6A, the multi-treatment embedding selection system 102 obtains parameters for distribution q(t|x). The multi-treatment embedding selection system 102 generates an embedding. The multi-treatment embedding selection system 102 feeds the generated embedding to the network to obtain parameters for the distribution q(y|t,x). As illustrated in FIG. 7, the multi-treatment embedding selection system 102 compares the distribution q(t|x) and the distribution q(y|t,x) with training data 702 (e.g., historical data reflecting ground truth samples reflecting y given t and x and/or distributions reflecting y given t and x). For example, the multi-treatment embedding selection system 102 compares the generated distribution q(t|x) with the actual training treatment given the training digital characteristics. The multi-treatment embedding selection system 102 does the same for the generated distribution q(y|t,x).

The multi-treatment embedding selection system 102 also compares the probability distributions generated by the decoder network 630 with training data. In particular, the multi-treatment embedding selection system 102 compares the distributions $p(t|z)$, $p(x_b|z)$, $p(x_c|z)$, and $p(x_j|z)$ with training data 702. Additionally, the multi-treatment embedding selection system 102 compares p(y|t,z) with training data 702. As described above, the multi-treatment embedding selection system 102 compares the generated distributions with the respective distributions that are observed within the training data. For example, the multi-treatment embedding selection system 102 compares the distribution of the probability of outcome y given treatments t and latent features z p(y|t,z) with training data.

Additionally, the multi-treatment embedding selection system 102 compares the generated multi-treatment effect estimation y with the training effect (e.g., the actual outcome) from the training data. For example, the multi-treatment embedding selection system 102 applies the variational autoencoder to the training treatments and training characteristics to predict a multi-treatment effect estimation y. The multi-treatment embedding selection system 102 compares the predicted multi-treatment effect estimation y with the training effect.

Specifically, the multi-treatment embedding selection system 102 compares distributions with training data 702 utilizing a loss function. In particular, the multi-treatment embedding selection system 102 can utilize a loss function that determines a measure of loss between a predicted distribution and ground truth. The multi-treatment embedding selection system 102 can then modify internal parameters of a generative machine learning model based on the measure of loss. For example, the multi-treatment embedding selection system 102 can modify internal parameters of individual layers within the variational autoencoder to reduce (e.g., minimize) the measure of loss. By repeatedly analyzing input samples, comparing distributions with ground truth training data, and modifying internal parameters to reduce a measure of loss, the multi-treatment embedding selection system 102 can train the generative machine learning model.

In at least one embodiment, the multi-treatment embedding selection system 102 uses variational inference algorithm for training as described by Dustin Tran, Alp Kucukelbir, Adji B Dieng, Maja Rudolf, Dawen Liang, and David M Blei In Edward: A library for probabilistic modeling, inference, and criticism at arXiv preprint arXiv:1610.09787 (2016), which is incorporated herein by reference. For example, in relation to FIG. 7 the multi-treatment embedding selection system 102 performs the following loss function:

$$\mathcal{F}_{CEVAE} = \mathcal{L} + \sum_{i=1}^{N} (\log q(t_i = t_i^* | x_i^*) + \log q(y_i = y_i^* | x_i^*, t_i^*))$$

In the above loss function, $x_i$ represents observed digital characteristics, $t_i^*$ represents treatment random values in the training set, and $y_i^*$ represents outcome random variables in the training set. In at least one embodiment, L2 regularization is added to the loss function. The multi-treatment embedding selection system 102 minimizes the loss to estimate the network parameters.

The multi-treatment embedding selection system 102 also yields better performance results in experiments relative to other conventional models. For example, experiments conducted research relative to the following models: Random Forest (RF), k-nearest neighbor (k-NN), Gradient Boosting Machine (GBM), Balancing Linear Regression (BLR), Treatment-Agnostic Representation Network (TARNet), Counterfactual Regression with Wasserstein distance (CFR WASS), Causal Effect Variational Autoencoder (CEVAE), and the Task Embedding Causal Effect Variational Autoencoder (TECE-VAE, e.g., at least one embodiment of the multi-treatment embedding selection system 102). The following table illustrates out-of-sample metrics for various models in a case of unbalanced data (i.e., a dataset in which some data points are unobserved). Bold indicates the model with the best performance for each metric.

TABLE 1

| Model Name | RMSE | Absolute Error | Average PEHE Error | Regret | Micro - Averaged F-score |
|---|---|---|---|---|---|
| RF | 9.118 ± 0.841 | 5.350 ± 0.494 | 8.233 ± 0.942 | 3.399 ± 0.233 | 0.193 ± 0.031 |
| k-NN | 8.402 ± 0.494 | 5.091 ± 0.271 | 5.711 ± 0.299 | 5.711 ± 0.425 | 0.061 ± 0.014 |
| GBM | 6.709 ± 0.569 | 4.118 ± 0.349 | 6.288 ± 0.609 | 2.205 ± 0.183 | 0.395 ± 0.062 |
| BLR* | 15.739 ± 0.823 | 10.582 ± 0.645 | 5.412 ± 0.345 | 3.962 ± 0.461 | 0.106 ± 0.039 |
| BNN-2-2* | 15.431 ± 0.767 | 10.580 ± 0.591 | 5.513 ± 0.298 | 2.824 ± 0.380 | 0.216 ± 0.073 |
| CFR WASS* | 8.101 ± 0.133 | 5.224 ± 0.113 | 6.145 ± 0.150 | 4.890 ± 0.140 | 0.080 ± 0.021 |
| CEVAE* | 22.788 ± 2.387 | 16.240 ± 1.783 | 16.488 ± 2.318 | 4.131 ± 0.394 | 0.108 ± 0.027 |
| TECE-VAE | 4.012 ± 0.186 | 2.438 ± 0.115 | 3.952 ± 0.198 | 1.599 ± 0.178 | 0.511 ± 0.058 |

*Original code modified for multiple treatments

Table 1 illustrates differences between models commonly utilized by conventional systems and the TECE-VAE utilized by the multi-treatment embedding selection system 102. Table 1 illustrates results from experiments that predicted outcomes for subsets of treatments from three potential treatments. The experiments included only three potential treatments instead of more potential treatments (e.g., five) because many models utilized by conventional systems took multiple hours to estimate. Thus, because the TECE-VAE model is expected to perform even better with additional potential treatments, the TECE-VAE would likely outperform other models by larger margins when considering additional potential treatments. Table 1 includes the following evaluation metrics: Root Mean Square Error (RMSE), Absolute Error, Average Precision in Estimation of Heterogenous Effect (PEHE) Error, Regret, and Micro-Averaged F-score.

Table 1 illustrates that the proposed task embedding variational autoencoder (i.e., TECE-VAE) utilized by the multi-treatment embedding selection system 102 outperforms the closest baseline in terms of RMSE and Absolute error, TARNet, by 21% and 39% respectively. This demonstrates a large improvement over other methods utilized by conventional systems. In terms of PEHE and Regret, the multi-treatment embedding selection system 102 outperforms the closest baselines by 33% and 38% respectively. Regret measures the loss due to applying the optimal treatment subset for each customer using a particular causal inference model instead of the ground truth optimal treatments. The multi-treatment embedding selection system 102 makes improvements of at least 38%.

As mentioned above, Table 1 illustrates out-of-sample metrics for various models in the case of unbalanced data. Table 2 below illustrates out-of-sample metrics for the various models in the case of balanced data where all elements have been observed. As with Table 1, bold indicates the model with the best performance for each metric.

TABLE 2

| Model Name | RMSE | Absolute Error | Average PEHE Error | Regret | Micro - Averaged F-score |
|---|---|---|---|---|---|
| k-NN | 5.069 | 2.791 | 3.608 | 2.899 | 0.174 |
| RF | 4.516 | 2.430 | 3.449 | 2.147 | 0.261 |
| GBM | 3.781 | 2.072 | 3.434 | 1.617 | 0.440 |
| BART | 3.531 | 1.905 | 3.397 | 1.533 | 0.450 |
| BLR* | 15.305 | 11.207 | 3.440 | 1.985 | 0.193 |
| BNN-2-2* | 3.142 | 1.848 | 3.525 | 1.805 | 0.338 |
| CFR WASS* | 3.228 | 1.973 | 3.509 | 2.306 | 0.173 |
| TARNet | 3.217 | 1.964 | 3.508 | 2.209 | 0.295 |
| CEVAE* | 4.598 | 2.429 | 4.337 | 1.938 | 0.226 |
| TECE-VAE | 3.190 | 1.886 | 3.189 | 1.656 | 0.298 |

*Original code modified for multiple treatments

As illustrated by Table 2, even for balanced data, the prediction error measured by RMSE of the predicted multi-treatment effect estimations is lower for the multi-treatment embedding selection system 102.

Figure 8:
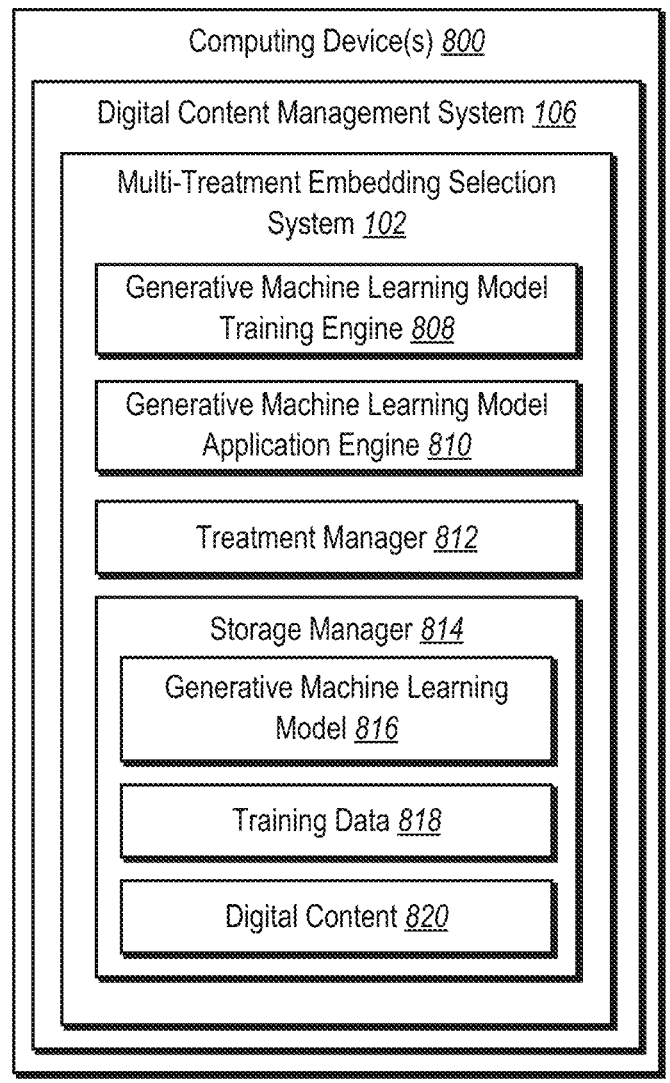
FIG. 8 illustrates a schematic diagram of a multi-treatment effect estimation system in accordance with one or more embodiments.

As mentioned, the multi-treatment embedding selection system 102 generates estimated effects for various treatment combinations applied to a user. For example, the multi-treatment embedding selection system 102 can receive digital characteristics and treatment subsets to determine which treatment subset should be applied to a user. FIG. 8 illustrates additional detail regarding components and capabilities of the digital content management system 106 (e.g., digital content management system 106). Specifically, FIG. 8 illustrates an example schematic diagram of the digital content management system 106 on an example computing device(s) 800 (e.g., one of the administrator client devices 108, third-party server device(s) 114, server device(s) 104, and/or user client devices 118. As shown in FIG. 8, the digital content management system 106 may include a multi-treatment embedding selection system 102. The multi-treatment embedding selection system 102 may include a generative machine learning model training engine 808, a generative machine learning model application engine 810, a treatment manager 812, and a storage manager 814.

As shown in FIG. 8, the multi-treatment embedding selection system 102 can include the generative machine learning model training engine 808. The generative machine learning model training engine 808 trains network parameters of the generative machine learning model using training data. In particular, the generative machine learning model training engine 808 compares probability distributions generated by the encoder and the decoder with the training data. Additionally, the generative machine learning model training engine 808 can determine, evaluate, identify, or generate a measure of loss or an error. generative machine learning model training engine 808 can compare training data with data generated by the variational autoencoder to test the accuracy of the variational autoencoder network parameters and to improve the accuracy as well.

As shown in FIG. 8, the multi-treatment embedding selection system 102 can include the generative machine learning model application engine 810. Generally, the generative machine learning model application engine 810 generates a multi-treatment effect estimation for a subset of treatments. In particular, the generative machine learning model application engine 810 uses the task embedding layer of the trained generative machine learning model to generate an embedding of a subset of treatments. The generative machine learning model application engine 810 analyzes the embedding to generate the multi-treatment effect estimation.

As shown in FIG. 8, the multi-treatment embedding selection system 102 can include the treatment manager 812. The treatment manager 812 can provide, store, manage, or maintain relevant treatment data. In particular, the treatment manager 812 can store multi-treatment effect estimations for a number of subsets of treatments. Based on determining the optimal multi-treatment effect estimation the treatment manager 812 can select a subset of treatments to provide to the client device.

As shown in FIG. 8, the multi-treatment embedding selection system 102 can include the storage manager 814. In particular, the storage manager 814 can communicate with one or more of the generative machine learning model training engine 808, the generative machine learning model application engine 810, and the treatment manager 812 to provide, store, manage, or maintain relevant data. For example, the storage manager 814 can store latent digital characteristics z, estimated effects y, digital characteristics x, treatments t, and training data. Additionally, the storage manager 814 stores probability distributions generated by the generative machine learning model 816 as well as training probability distributions. As shown in FIG. 8, the storage manager 814 can include the generative machine learning model 816, training data 818, and digital content 820.

As shown in FIG. 8, the storage manager 814 can include the generative machine learning model 816. Generally, the generative machine learning model 816 uses a task embedding layer to generate a multi-treatment effect estimation for a subset of treatments applied to a client device. The generative machine learning model 816 receives digital characteristics corresponding to the client device and a treatment as input. The generative machine learning model 816 uses the input to generate the multi-treatment effect estimation for a client device.

As illustrated in FIG. 8, the storage manager 814 includes the training data 818 and the digital content 820. The training data 818 can comprise training characteristic sets corresponding to training client devices, training treatments, and training effects. The digital content 820 can include digital content to be distributed to user client devices 118.

In one or more embodiments, each of the components of the digital content management system 106 are in communication with one another using any suitable communication technologies. Additionally, the components of the digital content management system 106 can be in communication with one or more other devices including one or more user client devices described above. It will be recognized that although the components of the digital content management system 106 are shown to be separate in FIG. 8, any of the subcomponents may be combined into fewer components, such as into a single component, or divided into more components as may serve a particular implementation. Furthermore, although the components of FIG. 8 are described in connection with the multi-treatment embedding selection system 102, at least some of the components for performing operations in conjunction with the multi-treatment embedding selection system 102 described herein may be implemented on other devices within the environment.

Figure 11:
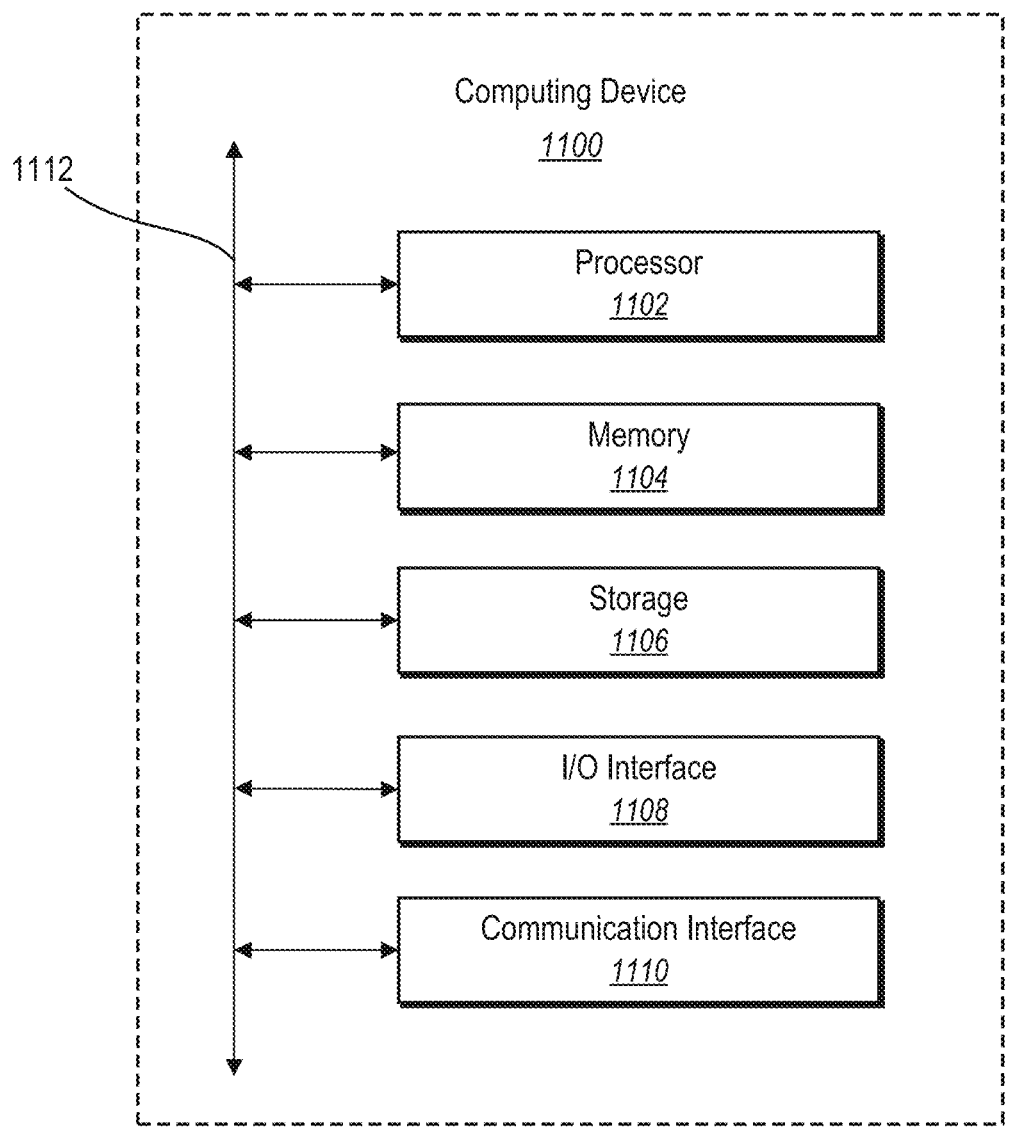
FIG. 11 illustrates a block diagram of an example computing device in accordance with one or more embodiments.

The components of the multi-treatment embedding selection system 102 can include one or more instructions stored on a computer-readable storage medium and executable by processors of one or more computing devices 800 (e.g., the computing device 1100 of FIG. 11). When executed by the one or more processors, the computer-executable instructions of the multi-treatment embedding selection system 102 can cause the computing device 800 to perform the methods described herein. Alternatively, the components of the multi-treatment embedding selection system 102 can comprise hardware, such as a special purpose processing device to perform a certain function or group of functions. Additionally or alternatively, the components of the multi-treatment embedding selection system 102 can include a combination of computer-executable instructions and hardware.

Furthermore, the components of the multi-treatment embedding selection system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the multi-treatment embedding selection system 102 may be implemented as part of a stand-alone application on a personal computing device or a mobile device. Alternatively or additionally, the components of the multi-treatment embedding selection system 102 may be implemented in any application that allows creation and delivery of marketing content to users, including, but not limited to, applications in ADOBE CREATIVE CLOUD® and/or ADOBE® MARKETING CLOUD, such as ADOBE® TARGET, ADOBE® CAMPAIGN, ADOBE® ANALYTICS, and ADOBE® MEDIA OPTIMIZER. "ADOBE," "CREATIVE CLOUD," "ADOBE MARKETING CLOUD," "ADOBE CAMPAIGN," "ADOBE ANALYTICS," and "ADOBE MEDIA OPTIMIZER," are registered trademarks of Adobe Systems Incorporated in the United States and/or other countries.

FIGS. 1-8, the corresponding text, and the examples provide a number of different systems, methods, and non-transitory computer readable media for generating and providing digital video summaries. In addition to the foregoing, embodiments can also be described in terms of flowcharts comprising acts for accomplishing a particular result. For example, FIGS. 9-10 illustrate flowcharts of example sequences of acts in accordance with one or more embodiments.

Figure 9:
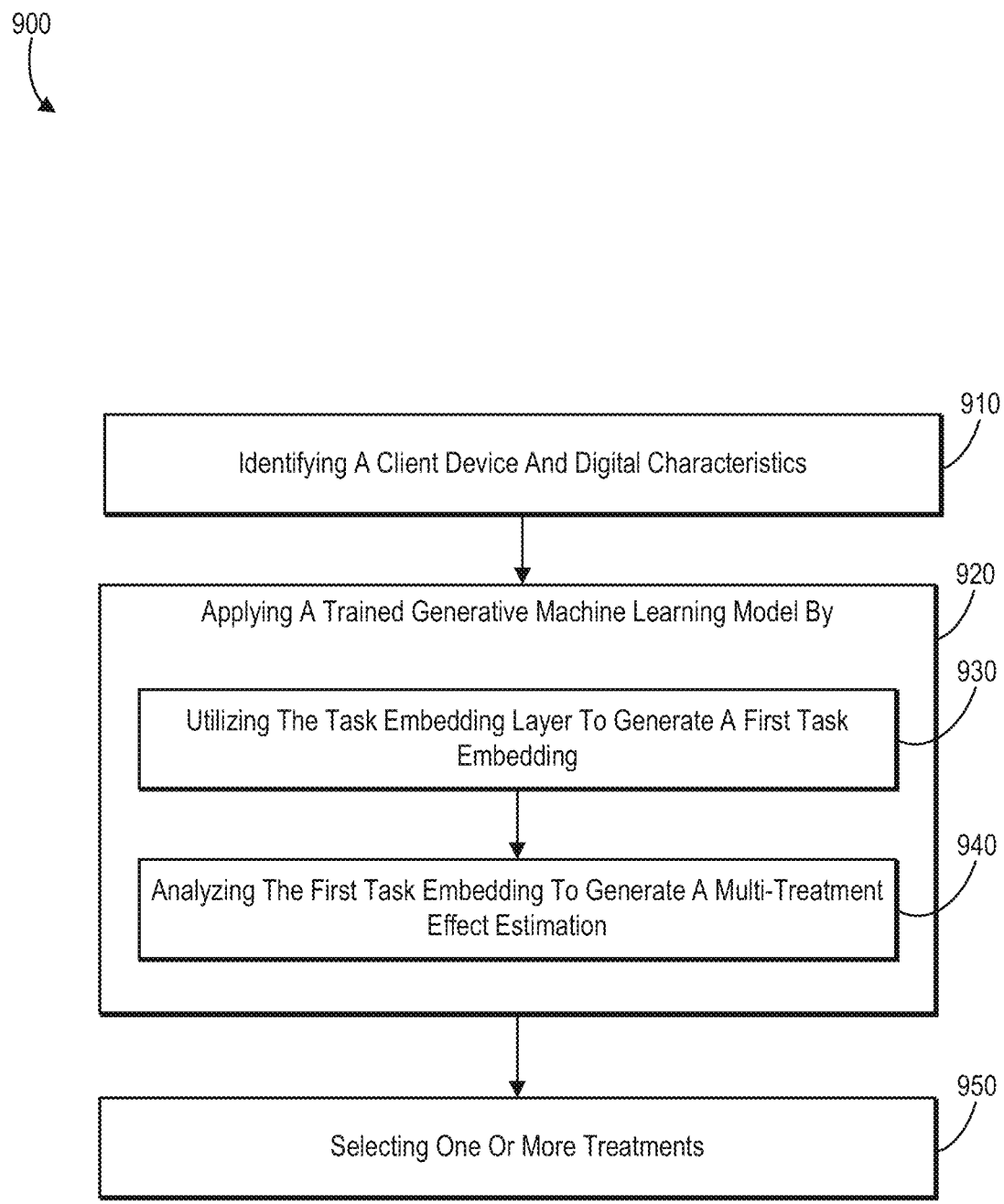
FIG. 9 illustrates a flowchart of a series of acts for selecting one or more treatments to provide to a client device in accordance with one or more embodiments.
Figure 10:
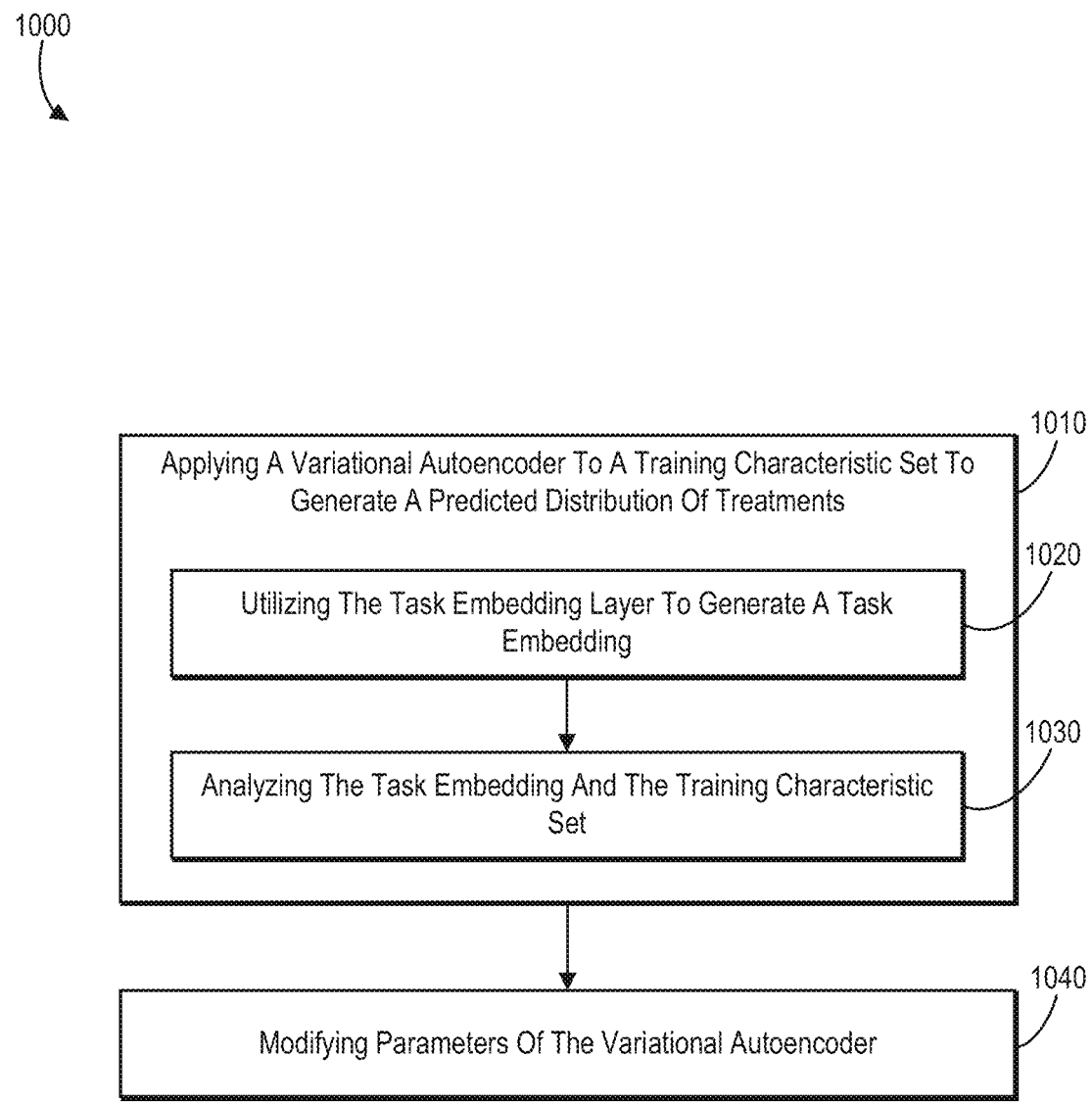
FIG. 10 illustrates a flowchart of a series of acts for training a generative machine learning model in accordance with one or more embodiments.

While FIG. 9 illustrates acts according to one embodiment, alternative embodiments may omit, add to, reorder, and/or modify any of the acts shown in FIG. 9. The acts of FIG. 9 can be performed as a method. Alternatively, a non-transitory computer readable medium can comprise instructions, that when executed by one or more processors, cause a computing device to perform the acts of FIG. 9. In still further embodiments, a system can perform the acts of FIG. 9. Additionally, the acts described herein may be repeated or performed in parallel with one another or in parallel with different instances of the same or other similar acts.

FIG. 9 illustrates an example series of acts 900 of selecting one or more treatments from a set of treatments to provide to a client device. In some embodiments, the multi-treatment embedding selection system 102 can perform the series of acts 900 by utilizing a trained generative machine learning model with a task embedding layer. In particular, the series of acts 900 can include an act 910 of identifying a client device and digital characteristics. For example, act 910 can include identifying a client device and digital characteristics corresponding to the client device. The trained generative machine learning model can comprise a variational autoencoder comprising an encoder having the task embedding layer and a decoder. Additionally, the set of treatments can comprise at least three of: providing digital content to the client device via e-mail, providing digital content to the client device via social media, providing digital content to the client device via a text message, providing digital content to the client device via a digital notification via a software application on the client device, providing digital content to the client device via paid search, or providing digital content to the client device via a website; the first subset of treatments comprises at least two treatments from the set of treatments; and the selected one or more treatments consist of the first subset of treatments. The digital characteristics can comprise online activity of a user associated with the client device.

The series of acts 900 can also include an act 920 of applying a trained generative machine learning model. In particular, the act 920 can involve applying a trained generative machine learning model with a task embedding layer to the digital characteristics corresponding to the client device to generate a multi-treatment effect estimation of a first subset of treatments from a set of treatments. More specifically, the series of acts 900 can include the act 930 of utilizing the task embedding layer to generate a first task embedding. In particular, act 930 includes utilizing the task embedding layer of the trained generative machine learning model to generate a first task embedding of the first subset of treatments from the set of treatments. Additionally, the series of acts 900 includes act 940 of analyzing the first task embedding to generate a multi-treatment effect estimation. In particular, act 940 includes analyzing the first task embedding of the first subset of treatments and the digital characteristics corresponding to the client device via the trained generative machine learning model to generate a first multi-treatment effect estimation of the first subset of treatments.

The series of acts 900 also includes act 950 of selecting one or more treatments. In particular, act 950 includes, based on the first multi-treatment effect estimation of the first subset of treatments, select one or more treatments from the set of treatments to provide to the client device, the one or more treatments comprising one or more distribution channels for providing digital content to the client device.

The series of acts 900 can also include the additional acts of utilizing the task embedding layer of the trained generative machine learning model to generate a second task embedding of a second subset of treatments from the set of treatments and analyzing the second task embedding of the second subset of treatments to generate a second multi-treatment effect estimation of the second subset of treatments.

The series of acts 900 can also include the additional act of selecting the one or more treatments from the set of treatments by comparing the multi-treatment effect estimation and the second multi-treatment effect estimation.

The series of acts 900 can also include the additional acts of utilizing the encoder to analyze the first task embedding of the first treatment subset and the digital characteristics corresponding to the client device to generate latent features of the client device and utilizing the decoder to analyze the latent features of the client device and the first task embedding of the first treatment to generate the first multi-treatment effect estimation.

While FIG. 10 illustrates acts according to one embodiment, alternative embodiments may omit, add to, reorder, and/or modify any of the acts shown in FIG. 10. The acts of FIG. 10 can be performed as a method. Alternatively, a non-transitory computer readable medium can comprise instructions, that when executed by one or more processors, cause a computing device to perform the acts of FIG. 10. In still further embodiments, a system can perform the acts of FIG. 10. Additionally, the acts described herein may be repeated or performed in parallel with one another or in parallel with different instances of the same or other similar acts.

FIG. 10 illustrates an example series of acts 1000 of training a variational autoencoder. In some embodiments, the multi-treatment embedding selection system 102 can perform the series of acts 1000 by utilizing a variational autoencoder having a task embedding layer and a digital repository of historical training data comprising a training characteristic sets corresponding to training client devices, training treatments, and training effects. Series of acts 1000 include act 1010 of applying a variational autoencoder to a training characteristic set to generate a predicted distribution of treatments. In particular, act 1010 includes the act of applying the variational autoencoder to a training characteristic set of the training characteristic sets to generate a predicted distribution of treatments in light of the training characteristic set. The variational autoencoder can comprise an encoder having the task embedding layer and a decoder.

Series of acts 1000 also includes act 1020 of utilizing the task embedding layer to generate a task embedding. In particular, act 1020 includes the act of utilizing the task embedding layer of the variational autoencoder to generate a task embedding of the treatments based on the predicted distribution of the treatments. Act 1020 can further comprise generating the predicted distribution of treatments in light of the training characteristic set; sampling the predicted distribution of treatments to generate a treatment vector; and generating the first task embedding by applying a weight matrix to the treatment vector.

Series of acts 1000 includes act 1030 of analyzing the task embedding and the training characteristic set. In particular, act 1030 includes the act of analyzing the task embedding and the training characteristic set via the variational autoencoder to generate a predicted multi-treatment effect. The act 1030 can further include an act of generating a predicted distribution of treatments in light of the latent features of the training client devices; sampling the predicted distribution of treatments in light of the latent features of the training client devices to generate a decoder treatment vector; and generating the predicted multi-treatment effect by applying a weight matrix to the decoder treatment vector.

Series of acts 1000 includes act 1040 of modifying parameters of the generative machine learning model. In particular, act 1040 includes modifying parameters of the generative machine learning model by comparing the predicted multi-treatment effect with a training effect from the training effects. Additionally, act 1040 can further comprise determining a measure of loss between the predicted distribution of treatments in light of the latent features of the training client devices with a training distribution of treatments in light of the latent features of the training client devices.

Series of acts 1000 can further include the acts of utilizing the encoder to analyze the task embedding of the treatments generated by the first task embedding layer to generate latent features of the training client devices and utilizing the decoder to analyze the latent features of the training client devices and the multi-task embedding of the treatments to generate the predicted multi-treatment effect.

Additionally, series of acts 1000 includes an act of modifying parameters of the generative machine learning model by determining a measure of loss between the predicted distribution of treatments in light of the training characteristic set and a training distribution of treatments in light of the training characteristic set.

In addition (or in the alternative) to the acts described above, in some embodiments, the acts 900 and/or the acts 1000 include a step for training a generative machine learning model with a task embedding layer utilizing the digital repository of historical training data. For example, the acts and algorithms described in reference to FIGS. 6A-6B and 7 can comprise the corresponding acts (or structure) for performing a step for training the generative machine learning model with the task embedding layer.

In addition (or in the alternative) to the acts described above, in some embodiments, the acts 900 and/or the acts 1000 also include a step for generating a multi-treatment effect estimation for the client device utilizing the digital characteristics via the trained generative machine learning model with the task embedding layer. For example, the acts and algorithms described in FIGS. 4 and 6A-6B can comprise the corresponding acts (or structure) for a step for generating the multi-treatment effect estimation for the client device utilizing the digital characteristics.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

FIG. 11 illustrates, in block diagram form, an example computing device 1100 (e.g., computing device 800, user client devices 118, administrator client device 108, and/or server device(s) 104) that may be configured to perform one or more of the processes described above. One will appreciate that the multi-treatment embedding selection system 102 can comprise implementations of the computing device 1100. As shown by FIG. 11, the computing device can comprise a processor(s) 1102, memory 1104, a storage device 1106, an I/O devices/interfaces 1108, and a communication interface 1110. Furthermore, the computing device 1100 can include an input device such as a touchscreen, mouse, keyboard, etc. In certain embodiments, the computing device 1100 can include fewer or more components than those shown in FIG. 11. Components of computing device 1100 shown in FIG. 11 will now be described in additional detail.

In particular embodiments, processor(s) 1102 includes hardware for executing instructions, such as those making up a computer program. As an example, and not by way of limitation, to execute instructions, processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example, and not by way of limitation, storage device 1106 can comprise a non-transitory storage medium described above. The storage device 1106 may include a hard disk drive (HDD), flash memory, a Universal Serial Bus (USB) drive or a combination of these or other storage devices.

The computing device 1100 also includes one or more input or output ("I/O") devices/interfaces 1108, which are provided to allow a user to provide input to (such as user strokes), receive output from, and otherwise transfer data to and from the computing device 1100. These I/O devices/ interfaces 1108 may include a mouse, keypad or a keyboard, a touch screen, camera, optical scanner, network interface, modem, other known I/O devices or a combination of such I/O devices/interfaces 1108. The touch screen may be activated with a writing device or a finger.

The I/O devices/interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1108 is configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 can provide one or more interfaces for communication (such as, for example, packet-based communication) between the computing device and one or more other computing devices 1100 or one or more networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can comprise hardware, software, or both that couples components of computing device 1100 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. In a digital medium environment for selecting and transmitting individualized digital content to client devices across multiple distribution channels, a computer-implemented method for utilizing a deep generative model to efficiently and accurately generate treatment effect estimations, the computer-implemented method comprising:
- identifying a client device and digital characteristics corresponding to the client device;
- applying a trained generative machine learning model with a task embedding layer to the digital characteristics corresponding to the client device to generate a multi-treatment effect estimation of a first combination of treatments from a set of treatments by:
  - utilizing the task embedding layer of the trained generative machine learning model to generate a first task embedding by processing the first combination of treatments from the set of treatments; and
  - analyzing the first task embedding of the first combination of treatments and the digital characteristics corresponding to the client device via the trained generative machine learning model to generate a first multi-treatment effect estimation of the first combination; and
- based on the first multi-treatment effect estimation of the first combination of treatments, selecting one or more treatments from the set of treatments to provide, to the client device, the one or more treatments comprising one or more distribution channels for providing digital content to the client device.

2. The method of claim 1, wherein the trained generative machine learning model with the task embedding layer comprises a variational autoencoder having the task embedding layer.

3. The method of claim 1, further comprising:
- utilizing the task embedding layer of the trained generative machine learning model to generate a second task embedding of a second combination of treatments from the set of treatments; and
- analyzing the second task embedding of the second combination of treatments to generate a second multi-treatment effect estimation of the second combination of treatments.

4. The method of claim 1, wherein the set of treatments comprise at least two of: providing digital content to the client device via e-mail, providing digital content to the client device via social media, providing digital content to the client device via a text message, providing digital content to the client device via a digital notification via a software application on the client device, providing digital content to the client device via paid search, or providing digital content to the client device via a website.

5. The method of claim 2, wherein the variational autoencoder comprises an encoder comprising the task embedding layer and a decoder comprising a second task embedding layer.

6. A non-transitory computer readable medium comprising instructions that, when executed by at least one processor, cause a computing device to:
- identify a client device and digital characteristics corresponding to the client device;
- apply a trained generative machine learning model with a task embedding layer to the digital characteristics corresponding to the client device to generate a multi-treatment effect estimation of a first combination of treatments from a set of treatments by:
  - utilizing the task embedding layer of the trained generative machine learning model to generate a first task embedding by processing the first combination of treatments from the set of treatments;
  - analyzing the first task embedding of the first combination of treatments and the digital characteristics corresponding to the client device via the trained generative machine learning model to generate a first multi-treatment effect estimation of the first combination of treatments; and
- based on the first multi-treatment effect estimation of the first combination of treatments, select one or more treatments from the set of treatments to provide to the client device, the one or more treatments comprising one or more distribution channels for providing digital content to the client device.

7. The non-transitory computer readable medium of claim 6, further comprising instructions that, when executed by the at least one processor, cause the computing device to:
- utilize the task embedding layer of the trained generative machine learning model to generate a second task embedding of a second combination of treatments from the set of treatments; and
- analyze the second task embedding of the second combination of treatments to generate a second multi-treatment effect estimation of the second combination of treatments.

8. The non-transitory computer readable medium of claim 6, wherein the trained generative machine learning model comprises a variational autoencoder comprising an encoder having the task embedding layer and a decoder.

9. The non-transitory computer readable medium of claim 6, wherein:
- the set of treatments comprises at least three of: providing digital content to the client device via e-mail, providing digital content to the client device via social media, providing digital content to the client device via a text message, providing digital content to the client device via a digital notification via a software application on the client device, providing digital content to the client device via paid search, or providing digital content to the client device via a website;
- the first combination of treatments comprises at least two treatments from the set of treatments; and
- the selected one or more treatments consist of the first combination of treatments.

10. The non-transitory computer readable medium of claim 6, wherein the digital characteristics comprise online activity of a user associated with the client device.

11. The non-transitory computer readable medium of claim 7, further comprising instructions that, when executed by the at least one processor, cause the computing device to select the one or more treatments from the set of treatments by comparing the multi-treatment effect estimation and the second multi-treatment effect estimation.

12. The non-transitory computer readable medium of claim 7, further comprising instructions that, when executed by the at least one processor, cause the computing device to: generate the first task embedding and the second task embedding by applying an embedding weight matrix to the first combination of treatments and the second combination of treatments.

13. The non-transitory computer readable medium of claim 8, further comprising instructions that, when executed by the at least one processor, cause the computing device to:
- utilize the encoder to analyze the first task embedding of the first combination of treatments and the digital characteristics corresponding to the client device to generate latent features of the client device; and
- utilize the decoder to analyze the latent features of the client device and the first task embedding of the first combination of treatments to generate the first multi-treatment effect estimation.

14. A system comprising:
at least one processor;
a memory comprising:
- a variational autoencoder having a task embedding layer;
- a digital repository of historical training data comprising a training characteristic set corresponding to training client devices, training treatments, and training effects; and
- instructions that, when executed by the at least one processor, cause the system to train the variational autoencoder by:
  - applying the variational autoencoder to a training characteristic set of the training characteristic sets to generate a predicted distribution of treatments in light of the training characteristic set;
  - sampling the predicted distribution of treatments to generate a treatment vector representing a combination of treatments;
  - utilizing the task embedding layer of the variational autoencoder to generate a task embedding of the treatments based on the treatment vector;
  - analyzing the task embedding and the training characteristic set via the variational autoencoder to generate a predicted multi-treatment effect; and
  - modifying parameters of the variational autoencoder by comparing the predicted multi-treatment effect with a training effect from the training effects.

15. The system of claim 14, wherein the variational autoencoder comprises an encoder having the task embedding layer and a decoder.

16. The system of claim 15 further comprising instructions that, when executed by the at least one processor, cause the system to:
- utilize the encoder to analyze the task embedding of the treatments generated by the task embedding layer to generate latent features of the training client devices; and
- utilize the decoder to analyze the latent features of the training client devices and the task embedding of the treatments to generate the predicted multi-treatment effect.

17. The system of claim 16 further comprising instructions that, when executed by the at least one processor, cause the system to generate the task embedding of the treatments by generating the task embedding by applying a weight matrix to the treatment vector.

18. The system of claim 16 further comprising instructions that, when executed by the at least one processor, cause the system to generate the predicted multi-treatment effect by:
- generating a predicted distribution of treatments in light of the latent features of the training client devices;
- sampling the predicted distribution of treatments in light of the latent features of the training client devices to generate a decoder treatment vector; and
- generating the predicted multi-treatment effect by applying a weight matrix to the decoder treatment vector.

19. The system of claim 17 further comprising instructions that, when executed by the at least one processor, cause the system to modify parameters of the variational autoencoder by determining a measure of loss between the predicted distribution of treatments in light of the training characteristic set and a training distribution of treatments in light of the training characteristic set.

20. The system of claim 18, further comprising instructions that, when executed by the at least one processor, cause the system to modify parameters of the variational autoencoder by determining a measure of loss between the predicted distribution of treatments in light of the latent features of the training client devices with a training distribution of treatments in light of the latent features of the training client devices.

* * * * *